United States Patent
Abedini et al.

(10) Patent No.: US 12,255,706 B2
(45) Date of Patent: Mar. 18, 2025

(54) AUTONOMOUS BEAM CONFIGURATION IN RADIO FREQUENCY REPEATERS

(71) Applicant: QUALCOMM Incorporated, San Diego, CA (US)

(72) Inventors: Navid Abedini, Basking Ridge, NJ (US); Jianghong Luo, Skillman, NJ (US); Tao Luo, San Diego, CA (US); Ashwin Sampath, Skillman, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 18/317,769

(22) Filed: May 15, 2023

(65) Prior Publication Data

US 2023/0291443 A1    Sep. 14, 2023

Related U.S. Application Data

(62) Division of application No. 17/409,583, filed on Aug. 23, 2021, now Pat. No. 11,695,456.

(60) Provisional application No. 63/070,179, filed on Aug. 25, 2020.

(51) Int. Cl.
*H04B 7/0426* (2017.01)
*H04B 7/08* (2006.01)
*H04W 72/044* (2023.01)

(52) U.S. Cl.
CPC ............ *H04B 7/043* (2013.01); *H04B 7/086* (2013.01); *H04W 72/046* (2013.01); *H04W 72/0473* (2013.01)

(58) Field of Classification Search
CPC ........ H04B 7/043; H04B 7/086; H04B 7/088; H04B 7/15528; H04B 7/0695; H04W 72/046; H04W 72/0473; H04W 88/085; H04W 52/0216; H04W 52/0219; H04W 52/028; Y02D 30/70
See application file for complete search history.

(56) References Cited

U.S. PATENT DOCUMENTS

| | | |
|---|---|---|
| 10,608,678 B1 | 3/2020 | Hormis et al. |
| 11,695,456 B2 | 7/2023 | Abedini |
| 11,736,169 B2 * | 8/2023 | Cha ...................... H04B 17/327 370/329 |
| 2011/0177823 A1 * | 7/2011 | Miao ...................... H04B 7/155 455/450 |
| 2017/0195998 A1 * | 7/2017 | Zhang .................. H04W 52/365 |
| 2017/0222693 A1 | 8/2017 | Shen et al. |
| 2017/0277707 A1 | 9/2017 | Boudreau et al. |
| 2018/0198539 A1 | 7/2018 | Kim et al. |
| 2018/0316411 A1 | 11/2018 | Yoshimura et al. |
| 2018/0331746 A1 * | 11/2018 | Okuyama ............ H04B 7/0632 |

(Continued)

*Primary Examiner* — Kenneth T Lam
(74) *Attorney, Agent, or Firm* — QUALCOMM Incorporated

(57) ABSTRACT

Aspects of the disclosure relate to beam configuration for RF repeaters. An RF repeater is configured to measure received power of one or more signals in the repeater for each of a plurality of beam directions. Further, the repeater determines a beam forming configuration for a fronthaul link between the repeater and at least one base station based on the measured received power of each of plurality of beam directions. The repeater may also be configured to determine beam configurations for access links between the repeater and user equipment.

15 Claims, 17 Drawing Sheets

(56) References Cited

U.S. PATENT DOCUMENTS

| | | |
|---|---|---|
| 2019/0124696 A1 | 4/2019 | Islam et al. |
| 2019/0140735 A1 | 5/2019 | Fox |
| 2019/0207668 A1 | 7/2019 | Koifman et al. |
| 2020/0177242 A1 | 6/2020 | Kim et al. |
| 2020/0252838 A1 | 8/2020 | Akdeniz et al. |
| 2021/0126702 A1* | 4/2021 | Kohavi .............. H04B 7/15535 |
| 2021/0235525 A1 | 7/2021 | Schmidt et al. |
| 2022/0069868 A1 | 3/2022 | Abedini |
| 2022/0408446 A1* | 12/2022 | Zirwas ................. H04W 24/08 |

* cited by examiner

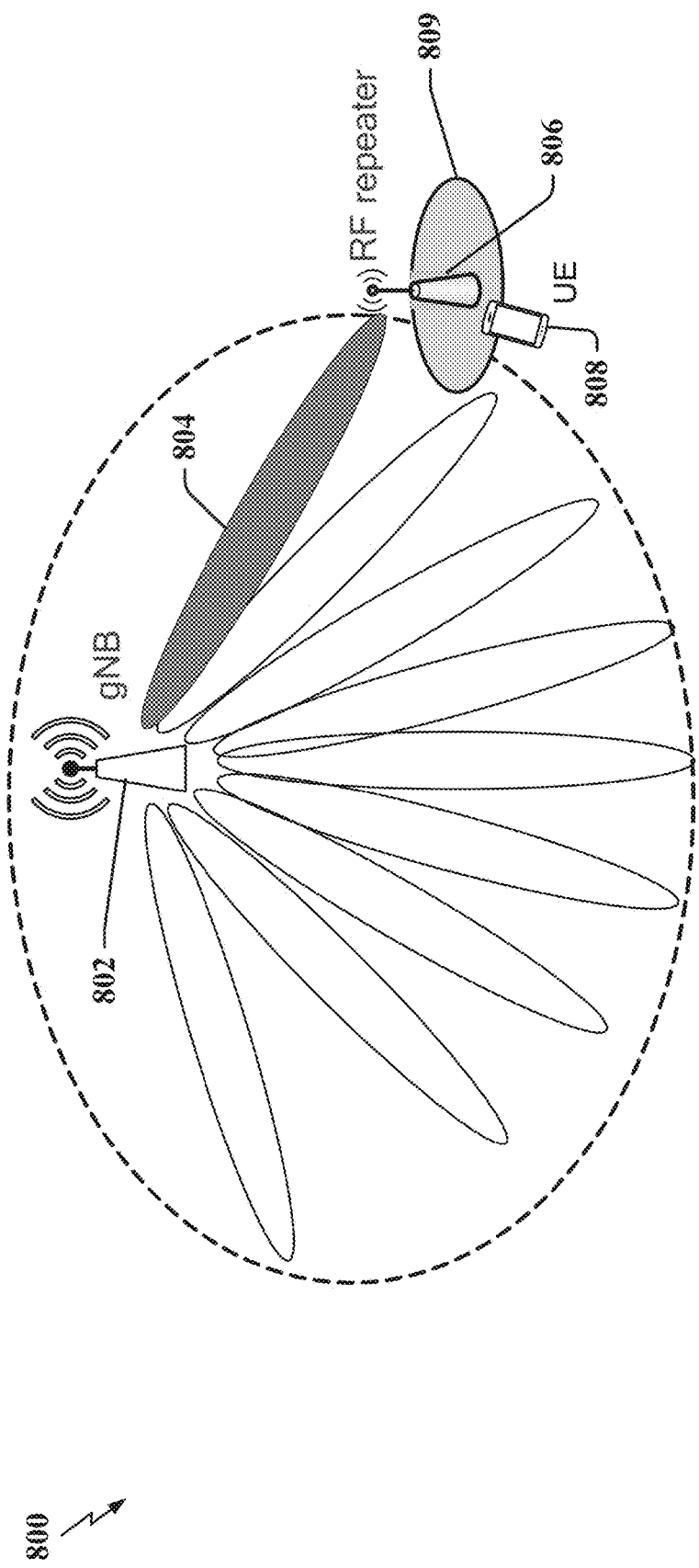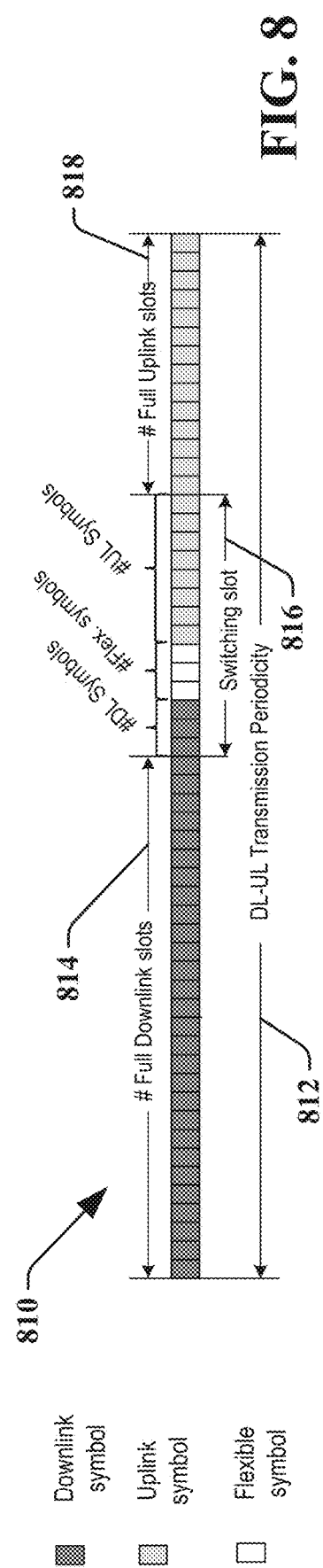
FIG. 8

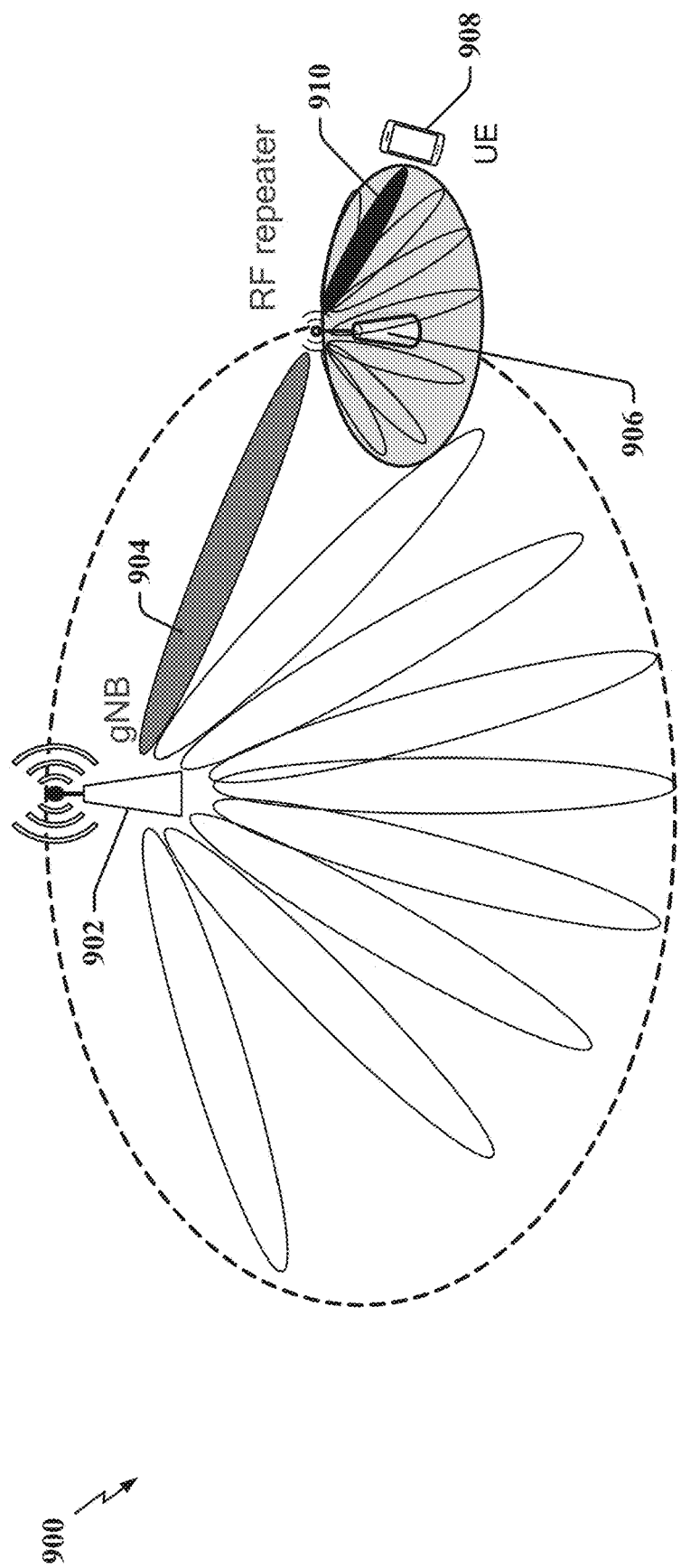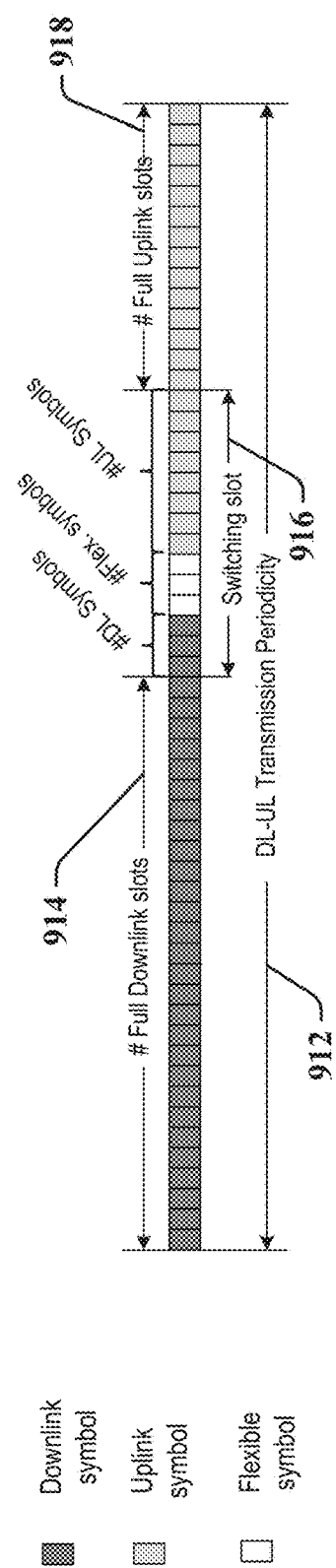
FIG. 9

1600

START
↓
1602 — Receive one or more signals from at least one of a base station or one or more user equipment (UE)
↓
1604 — Measure received power of each of the one or more signals for each of the plurality of beam directions
↓
1606 — Determine a beam forming configuration for transmissions on a fronthaul link between the repeater and at least one base station based on the measured received power of the one or more signals
↓
END

FIG. 16

AUTONOMOUS BEAM CONFIGURATION IN RADIO FREQUENCY REPEATERS

CROSS REFERENCE TO RELATED APPLICATIONS

This application is a divisional of U.S. patent application Ser. No. 17/409,583 filed in the U.S. Patent and Trademark Office on Aug. 23, 2021, and claims priority to and the benefit of U.S. Provisional Application No. 63/070,179 filed in the U.S. Patent and Trademark Office on Aug. 25, 2020, the entire contents of both applications are incorporated herein by reference as if fully set forth below in its entirety and for all applicable purposes.

TECHNICAL FIELD

The technology discussed below relates generally to wireless communication systems, and more particularly, to autonomous beam configuration in radio frequency (RF) repeaters.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple UEs. For example, a base station may allocate different resources (e.g., time domain and frequency domain resources) for different UEs operating within a cell of the base station. To extend the coverage of a wireless network, repeater devices may be used to relay communication traffic between at least two nodes.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

According to one aspect a method of beam forming in a repeater in a communication system is disclosed. The method includes receiving one or more signals in the repeater for each of a plurality of beam directions and measuring received power of each of the one or more signals for each of the plurality of beam directions. Further, the method includes determining a beam forming configuration for transmissions on a fronthaul link between the repeater and at least one base station based on the measured received power of the one or more signals.

According to another aspect a wireless repeater device in a wireless communication network is disclosed. The wireless repeater includes a wireless transceiver, a memory, and a processor communicatively coupled to the wireless transceiver and the memory. The processor and the memory are configured to receive one or more signals in the repeater for each of a plurality of beam directions, and to measure received power of each of the one or more signals for each of the plurality of beam directions. The processor and memory are further configured to determine a beam forming configuration for transmissions on a fronthaul link between the repeater and at least one base station based on the measured received power of the one or more signals.

In yet another aspect, a method of beam forming in a repeater in a communication system is disclosed. The method includes receiving one or more signals from at least one of a base station or one or more user equipment (UE). Further, the method includes measuring received power for the received one or more signals at a plurality of beam locations except for beam locations selected for serving a fronthaul link between the repeater and the base station. Yet further, the method includes selecting a beam forming configuration for transmissions for an access link between the repeater and the UE based on the measuring of the received power of the one or more signals at the plurality of beam locations.

According to yet another aspects, a wireless repeater device in a wireless communication network is disclosed. The wireless repeater includes a wireless transceiver, a memory, and a processor communicatively coupled to the wireless transceiver and the memory. The processor and the memory are configured to receive one or more signals from at least one of a base station or one or more user equipment (UE), and measure received power for the received one or more signals at a plurality of beam locations except for beam locations selected for serving a fronthaul link between the repeater and the base station. Additionally, the processor and the memory are configured to select a beam forming configuration for transmissions for an access link between the repeater and the UE based on the measuring of the received power of the one or more signals at the plurality of beam locations.

These and other aspects of the disclosure will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 8 is a diagram illustrating an example of a communication system utilizing an RF repeater according to some aspects.

FIG. 9 is a diagram illustrating another example of a communication system utilizing a smart repeater according to some aspects.

FIG. 16 is a flow chart illustrating an exemplary method implemented at a wireless repeater device according to some aspects.

DETAILED DESCRIPTION

Figure 1:
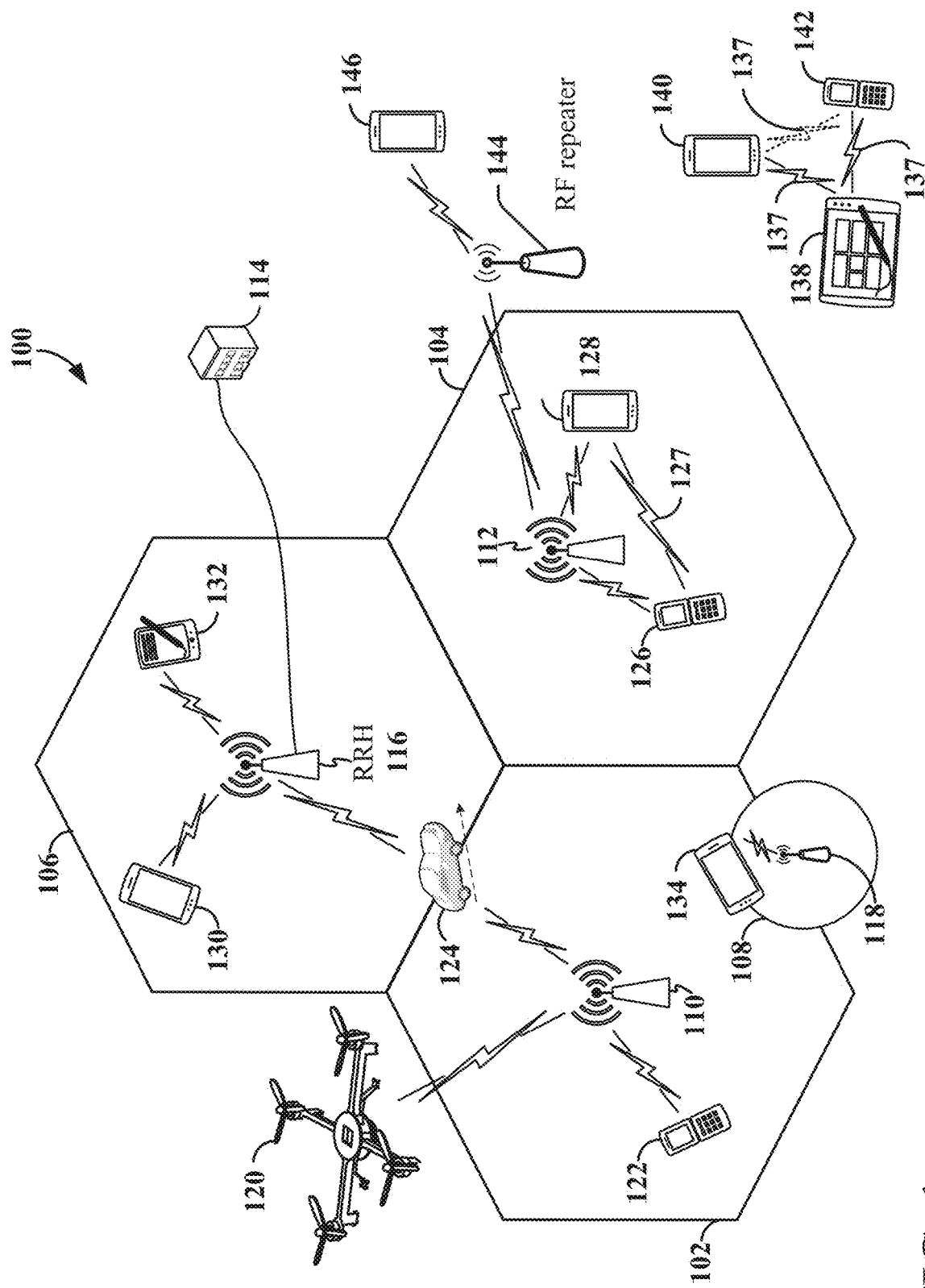
FIG. 1 is an illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Various aspects of the disclosure relate to autonomous beam configuration of a radio frequency (RF) repeater device in communication systems, where RF repeaters are non-regenerative type of relay nodes that simply amplify-and-forward the signals that they receive. In a particular aspect, the disclosure relates to an RF repeater that may be configured to autonomously or independently select a beam configuration for receiving signals to be repeated from a base station, gNodeB, or other network device or cell over a fronthaul link. Additionally, the RF repeater may be configured to autonomously or independently select a beam configuration for transmitting (i.e., repeating) the received signals to a user equipment (UE), for example, over an access link (AL). As will be discussed, the autonomous beam configuration may be performed in the RF repeater that is configured to measure received power of signals, as well as being able to scan across multiple beam directions to determine optimal beam selection.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3rd Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading. Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In some further examples, the RAN 100 may include an RF repeater 144 in communication with a base station or gNB such as base station 112. The RF repeater 144 is configured to repeat UL and DL transmissions between the base station 112 and one or more UEs, such as UE 146 as an example. Furthermore, as will be discussed later, the RF repeater 144 may be configured to utilize beam forming for transmission to a UE such as UE 146.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Figure 2:
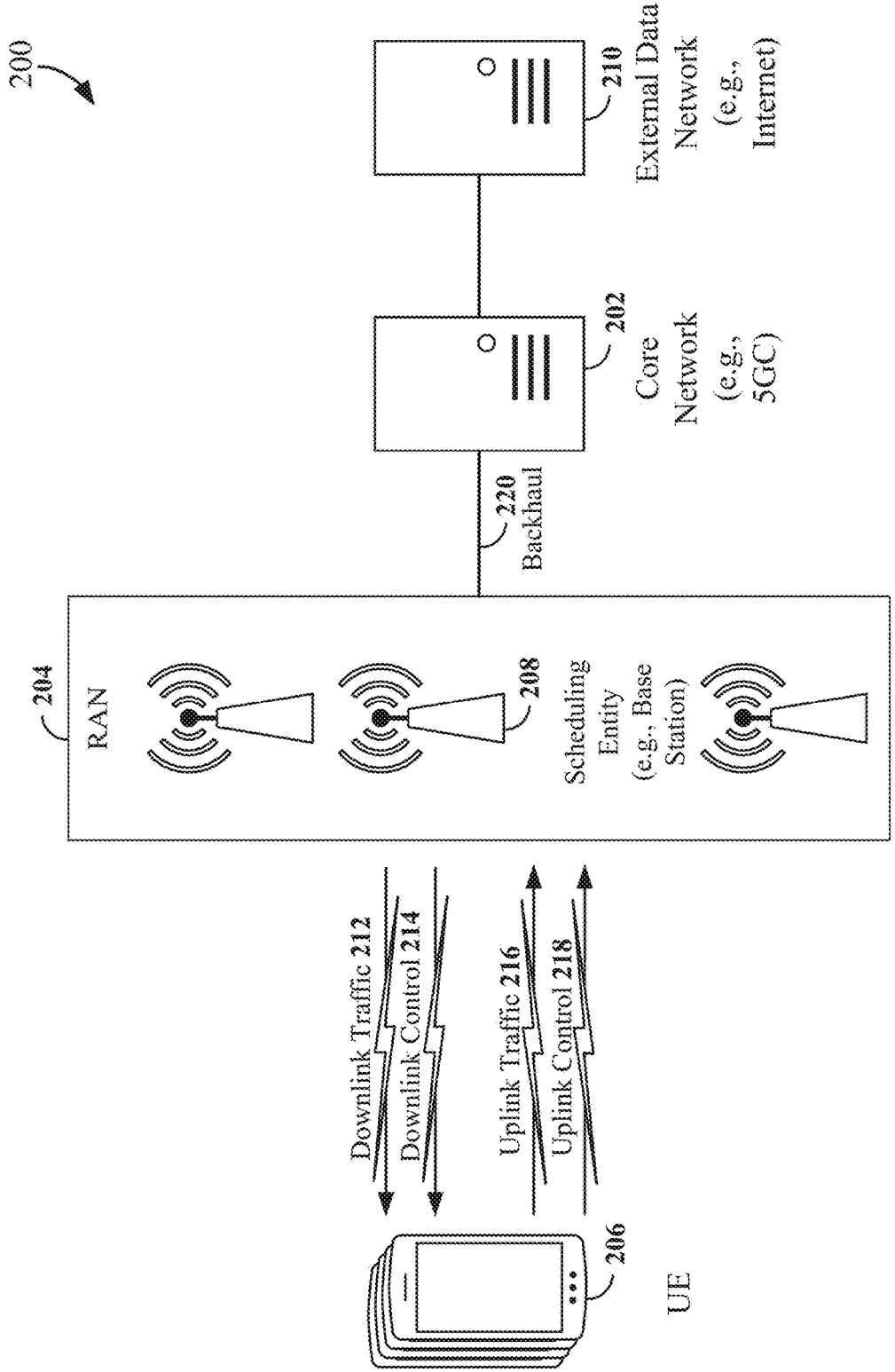
FIG. 2 is an illustration of an example of a radio access network (RAN) according to some aspects.

FIG. 2, as another illustrative example without limitation, illustrates various aspects with reference to a schematic of a wireless communication system 200. The wireless communication system 200 includes three interacting domains: a core network 202, a radio access network (RAN) 204, and a user equipment (UE) 206. By virtue of the wireless communication system 200, the UE 206 may be enabled to carry out data communication with an external data network 210, such as (but not limited to) the Internet.

The RAN 204 may implement any suitable wireless communication technology or technologies to provide radio access to the UE 206. As one example, the RAN 204 may operate according to 3rd Generation Partnership Project (3GPP) New Radio (NR) specifications. As another example, the RAN 204 may operate under a hybrid of 5G NR and Evolved Universal Terrestrial Radio Access Network (eUTRAN) standards, often referred to as LTE, such as in non-standalone (NSA) systems including EN-DC systems. The 3GPP also refers to this hybrid RAN as a next-generation RAN, or NG-RAN. Additionally, many other examples may be utilized within the scope of the present disclosure.

As illustrated in FIG. 2, the RAN 204 includes a plurality of base stations 208. In different technologies, standards, or contexts, the base stations 208 may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The RAN 204 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Wireless communication between the RAN 204 and a UE 206 may be described as utilizing an air interface. Transmissions over the air interface from a base station (e.g., base station 208) to a UE (e.g., UE 206) may be referred to as downlink (DL) transmission. In accordance with certain aspects of the present disclosure, the term downlink may refer to a point-to-multipoint transmission originating at a scheduling entity (described further below; e.g., base station 208). Another way to describe this scheme may be to use the term broadcast channel multiplexing. Transmissions from a UE (e.g., UE 206) to a base station (e.g., base station 208) may be referred to as uplink (UL) transmissions. In accordance with further aspects of the present disclosure, the term uplink may refer to a point-to-point transmission originating at a UE (e.g., UE 206).

In some examples, access to the air interface may be scheduled, wherein a scheduling entity (e.g., a base station 208) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UE 206, which may be a scheduled entity, may utilize resources allocated by the scheduling entity 208.

As illustrated in FIG. 2, a base station or scheduling entity 208 may broadcast downlink traffic 212 to one or more UEs (e.g., UE 206). Broadly, the base station or scheduling entity 208 may be configured as a node or device responsible for scheduling traffic in a wireless communication network, including the downlink traffic 212 and, in some examples, uplink traffic 216 from the UE 206 to the scheduling entity 208. The UE 206 may be configured as a node or device that also receives downlink control information, including but not limited to scheduling information (e.g., a grant), synchronization or timing information, or other control information from another entity in the wireless communication network such as the scheduling entity 208. Furthermore, the UE 206 may send uplink control information to the base station 208 including but not limited to scheduling information (e.g., grants), synchronization or timing information, or other control information.

In general, base stations 208 may include a backhaul interface for communication with a backhaul portion 222 of the wireless communication system. The backhaul 222 may provide a link between a base station 208 and the core network 202. Further, in some examples, a backhaul interface may provide interconnection between the respective base stations 208. Various types of backhaul interfaces may be employed, such as a direct physical connection, a virtual network, or the like using any suitable transport network.

The core network 202 may be a part of the wireless communication system 200, and may be independent of the radio access technology used in the RAN 204. In some examples, the core network 202 may be configured according to 5G standards (e.g., 5GC). In other examples, the core network 202 may be configured according to a 4G evolved packet core (EPC), or any other suitable standard or configuration.

In some examples, access to the air interface may be scheduled, wherein a scheduling entity (e.g., a base station 208) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UE 206, which may be a scheduled entity, may utilize resources allocated by the base station or scheduling entity 208.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
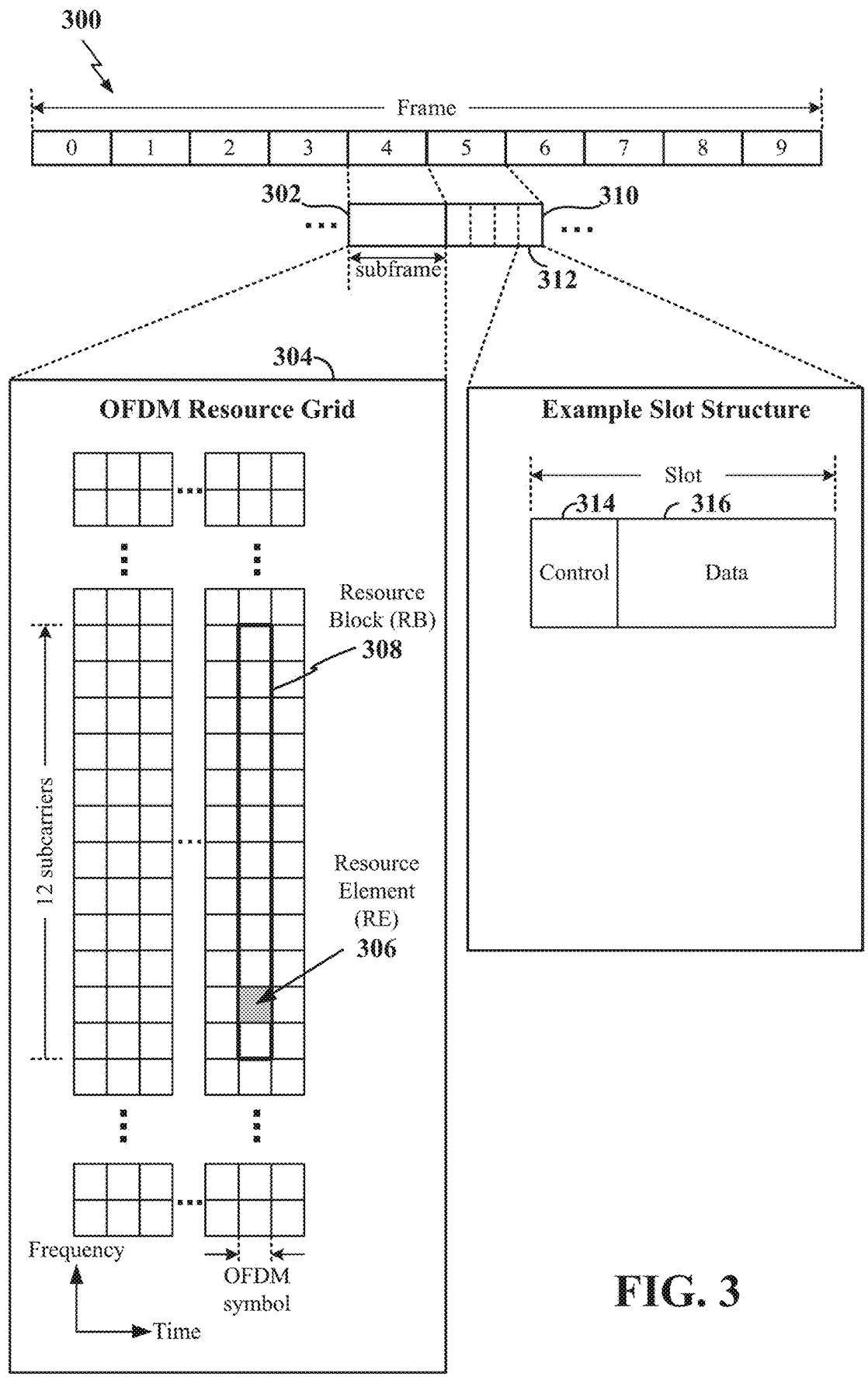
FIG. 3 is an illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to a discrete Fourier transform-spread-OFDM (DFT-s-OFDM) with a CP (also referred to as single-carrier FDMA (SC-FDMA)) waveform in substantially the same way as described herein below. That is, while some examples of the present disclosure may focus on an OFDM link for clarity, it should be understood that the same principles may be applied as well to SC-FDMA waveforms.

Within the present disclosure, a frame 300 refers to a duration of 10 ms for wireless transmissions, with each frame consisting of 10 subframes of 1 ms each. A transmission burst may include multiple frames. On a given carrier, there may be one set of frames in the UL, and another set of frames in the DL. Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs (scheduled entities) for downlink or uplink transmissions typically involves scheduling one or more resource elements 306 within one or more sub-bands or bandwidth parts (BWPs). Thus, a UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1 ms subframe) may consist of one or multiple adjacent slots. In the illustrative example shown in FIG. 3, one subframe 310 includes four slots. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened TTIs may in some cases be transmitted occupying resources scheduled for ongoing slot transmissions for the same or for different UEs. Any number of resource blocks may be utilized within a subframe or slot.

An expanded view of one of the slots 312 of subframe 310 illustrates the slot 312 as including a control region 314 and a data region 316. In a first example of the slot 312, the control region 314 may carry control channels (e.g., a physical downlink control channel (PDCCH)) and the data region 316 may carry data channels (e.g., a physical downlink shared channel (PDSCH)). In a second example of the slot 312, the control region 314 may carry control channels (e.g., a physical uplink control channel (PUCCH)) and the data region 316 may carry data channels (e.g., a physical uplink shared channel (PUSCH)). Of course, a slot may contain all DL, all UL, or at least one DL portion and at least one UL portion. The structures illustrated in FIG. 3 are merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), channel state information reference signal (CSI-RS), and/or a sounding reference signal (SRS). These pilots or reference signals may provide for a receiving device to perform channel estimation of the corresponding channel, which may enable coherent demodulation/detection of the control and/or data channels within the RB 308.

In some examples, the slot 312 may be utilized for broadcast or unicast communication. For example, a broadcast, multicast, or groupcast communication may refer to a point-to-multipoint transmission by one device (e.g., a base station, UE, or other similar device) to other devices. As used herein, a broadcast communication is delivered to all devices, whereas a multicast communication is delivered to multiple intended recipient devices. A unicast communication may refer to a point-to-point transmission by a one device to a single other device.

In a DL transmission, a transmitting device (e.g., the scheduling entity/base station 208) may allocate one or more REs 306 (e.g., DL REs within the control region 314) to carry DL control information (DCI) including one or more DL control 214 channels that may carry information, for example, originating from higher layers, such as a physical broadcast channel (PBCH), a physical hybrid automatic repeat request (HARQ) indicator channel (PHICH), a physical downlink control channel (PDCCH), etc., to one or more scheduled entities (e.g., UE/scheduled entity 206). A Physical Control Format Indicator Channel (PCFICH) may provide information to assist a receiving device in receiving and decoding the PDCCH and/or Physical HARQ Indicator Channel (PHICH). The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc. The PDCCH may carry downlink control 214, including downlink control information (DCI) for one or more UEs in a cell. This may include, but not limited to, power control commands, scheduling information, a grant, and/or an assignment of REs for DL and UL transmissions.

The base station may further allocate one or more REs 306 to carry other DL signals, such as a demodulation reference signal (DMRS); a phase-tracking reference signal (PT-RS); a positioning reference signal (PRS), a channel-stated information reference signal (CSI-RS); a primary synchronization signal (PSS); and a secondary synchronization signal (SSS). These DL signals, which may also be referred to as downlink physical signals, may correspond to sets of resource elements used by the physical layer but they generally do not carry information originating from higher layers. A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

In an UL transmission, a transmitting device (e.g., a UE/scheduled entity 206) may utilize one or more REs 306, including one or more UL control 218 channels that may carry uplink control information (UCI) to the scheduling entity/base station 208, for example. UCI may include a variety of packet types and categories, including pilots, reference signals, and information configured to enable or assist in decoding uplink data transmissions. In some examples, the uplink control information may include a scheduling request (SR), i.e., request for the scheduling entity to schedule uplink transmissions. Here, in response to the SR transmitted on the uplink control 218 channel from the scheduled entity 206, the scheduling entity/base station 208 may transmit downlink control information (DCI) that may schedule resources for uplink packet transmissions. UCI may also include HARQ feedback, such as an acknowledgment (ACK) or negative acknowledgment (NACK), channel state information (CSI), channel state feedback (CSF), or any other suitable UL control information (UCI). The UCI may originate from higher layers via one or more UL control channels, such as a physical uplink control channel (PUCCH), a physical random access channel (PRACH), etc. Further, UL REs 306 may carry UL physical signals that generally do not carry information originating from higher layers, such as demodulation reference signals (DMRS), phase-tracking reference signals (PT-RS), sounding reference signals (SRS), etc.

In addition to control information, one or more REs 306 (e.g., within the data region 316) may be allocated for user data traffic. Such traffic may be carried on one or more traffic channels, such as, for a DL transmission, a physical downlink shared channel (PDSCH), or for an UL transmission, a physical uplink shared channel (PUSCH). In some examples, one or more REs 306 within the data region 316 may be configured to carry SIBs (e.g., SIB1), carrying information that may enable access to a given cell.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
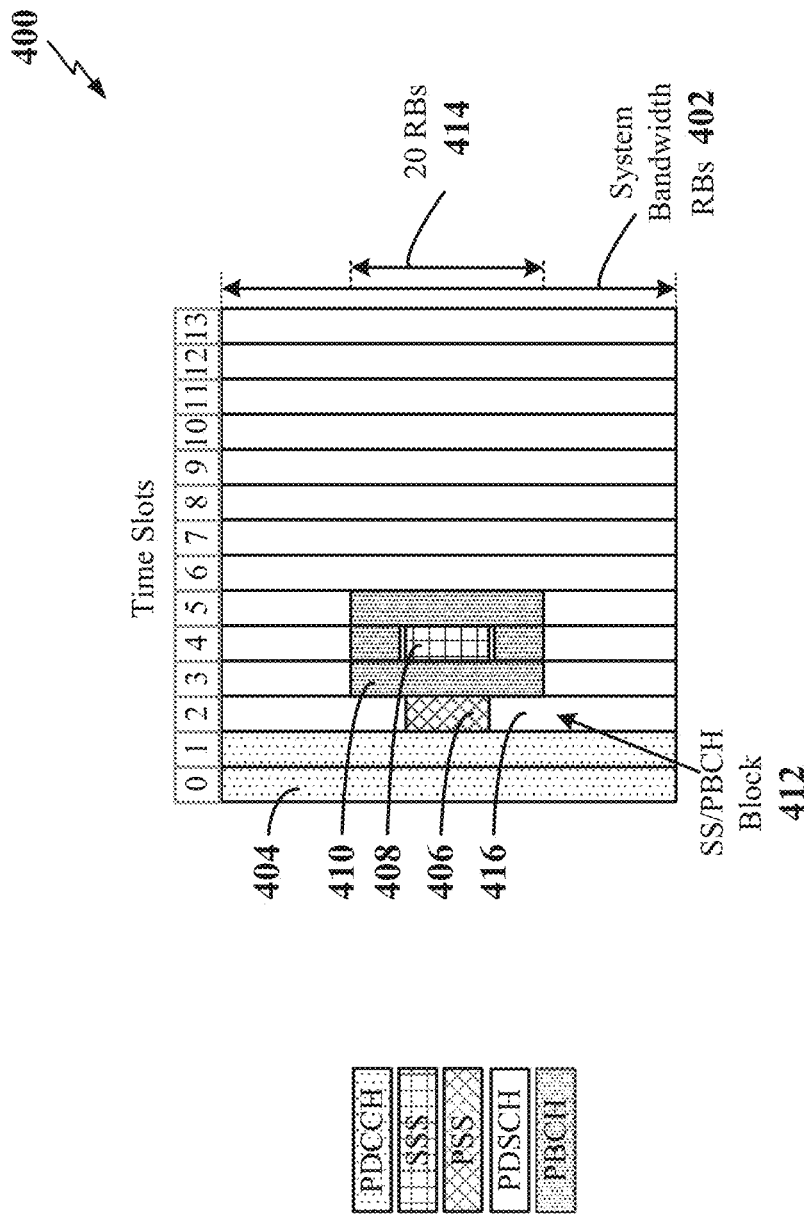
FIG. 4 is a diagram of an example of downlink channels according to some aspects.

FIG. 4 is a diagram 400 illustrating an example of DL channels within a 5G NR subframe. In this example (e.g., for a slot configuration 0), each slot may include 14 symbols, but the disclosure is not limited to such. A first arrowed line indicates a subset of the system bandwidth RBs 402 (e.g., a subset of the resource grid 304 of FIG. 3). The symbols on the DL may be cyclic prefix (CP) OFDM (CP-OFDM) symbols in some examples.

A physical downlink control channel (PDCCH) 404 may carry a DCI within one or more control channel elements (CCEs). Each CCE may include nine resource element (RE) groups (REGs), where each REG may include four consecutive REs in an OFDM symbol.

A primary synchronization signal (PSS) 406 is shown in symbol 2 of the subframe. A UE may use the PSS 406 to determine subframe and symbol timing and a physical layer identity. A secondary synchronization signal (SSS) 408 is shown in symbol 4 of the subframe. The SSS 408 may be used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DMRS. A physical broadcast channel (PBCH) 410, which carries a master information block (MIB) as discussed herein, may be logically grouped with the PSS 406 and the SSS 408 to form an SS/PBCH block 412. The MIB may indicate the number of RBs in the system bandwidth, a system frame number (SFN), and other information. As indicated by a second arrowed line, the length of the SS/PBCH block 412 is 20 RBs 414 in this example.

A physical downlink shared channel (PDSCH) 416 carries user data, broadcast system information not transmitted through the PBCH such as system information blocks (SIBs), and paging messages. In addition, the PDSCH 416 may carry a DCI (e.g., control-related information) in some examples.

The MIB in the PBCH may include system information (SI), along with parameters for decoding a system information block (SIB). In some examples, this SIB is a SystemInformationType 1 SIB (referred to as SIB1) that includes additional SI. Examples of SI transmitted in the MIB may include, but are not limited to, a subcarrier spacing, system frame number, a configuration of a PDCCH control resource set (CORESET) (e.g., PDCCH CORESET0), and a search space for SIB 1. Examples of SI transmitted in the SIB1 may include, but are not limited to, a random access search space, downlink configuration information, and uplink configuration information. The MIB and SIB1 together provide the minimum SI for initial access.

A brief discussion of an initial access procedure for a UE using the above information follows. As discussed above, a BS may transmit synchronization signals (e.g., including PSS and SSS) in the network to enable UEs to synchronize with the BS, as well as SI (e.g., including a MIB, RMSI, and other SI (OSI)) to facilitate initial network access. The BS may transmit the PSS, the SSS, and/or the MIB via SSBs over the PBCH and may broadcast the RMSI and/or the OSI over the PDSCH.

A UE attempting to access a RAN may perform an initial cell search by detecting a PSS from a BS (e.g., the PSS of a cell of the BS) of the RAN. The PSS may enable the UE to synchronize to period timing of the BS and may indicate a physical layer identity value assigned to the cell. The UE may also receive an SSS from the BS that enables the UE to synchronize on the radio frame level with the cell. The SSS may also provide a cell identity value, which the UE may combine with the physical layer identity value to identify the cell.

After receiving the PSS and SSS, the UE may receive the SI from the BS. The system information may take the form of the MIB and SIBs discussed above. The system information includes essential or critical information for a UE to access the network such as downlink (DL) channel configuration information, uplink (UL) channel configuration information, access class information, and cell barring information, as well as other less critical information. The MIB may include SI for initial network access and scheduling information for RMSI and/or OSI. After decoding the MIB, the UE may receive the RMSI and/or the OSI.

The SI includes information that enables a UE to determine how to conduct an initial access to a RAN (e.g., the RAN 204 of FIG. 2). In some examples, SIB 2 includes random access configuration information (e.g., a RACH configuration) that indicates the resources that the UE is to use to communicate with the RAN during initial access. The random access configuration information may indicate, for example, the resources allocated by the RAN for a PRACH procedure. For example, the RACH configuration may indicate the resources allocated by the network for the UE to transmit a PRACH preamble and to a receive random access response. In some examples, the RACH configuration identifies monitoring occasions (MOs) that specify a set of symbols (e.g., in a PRACH slot) that are scheduled by a base station for the PRACH procedure. The RACH configuration may also indicate the size of a random access response window during which the UE is to monitor for a response to a PRACH preamble. The RACH configuration may further specify that the random access response window starts a certain number of sub-frames after the end of the PRACH preamble in some examples. After obtaining the MIB, the RMSI and/or the OSI, the UE may thus perform a random access procedure for initial access to the RAN.

Figure 5:
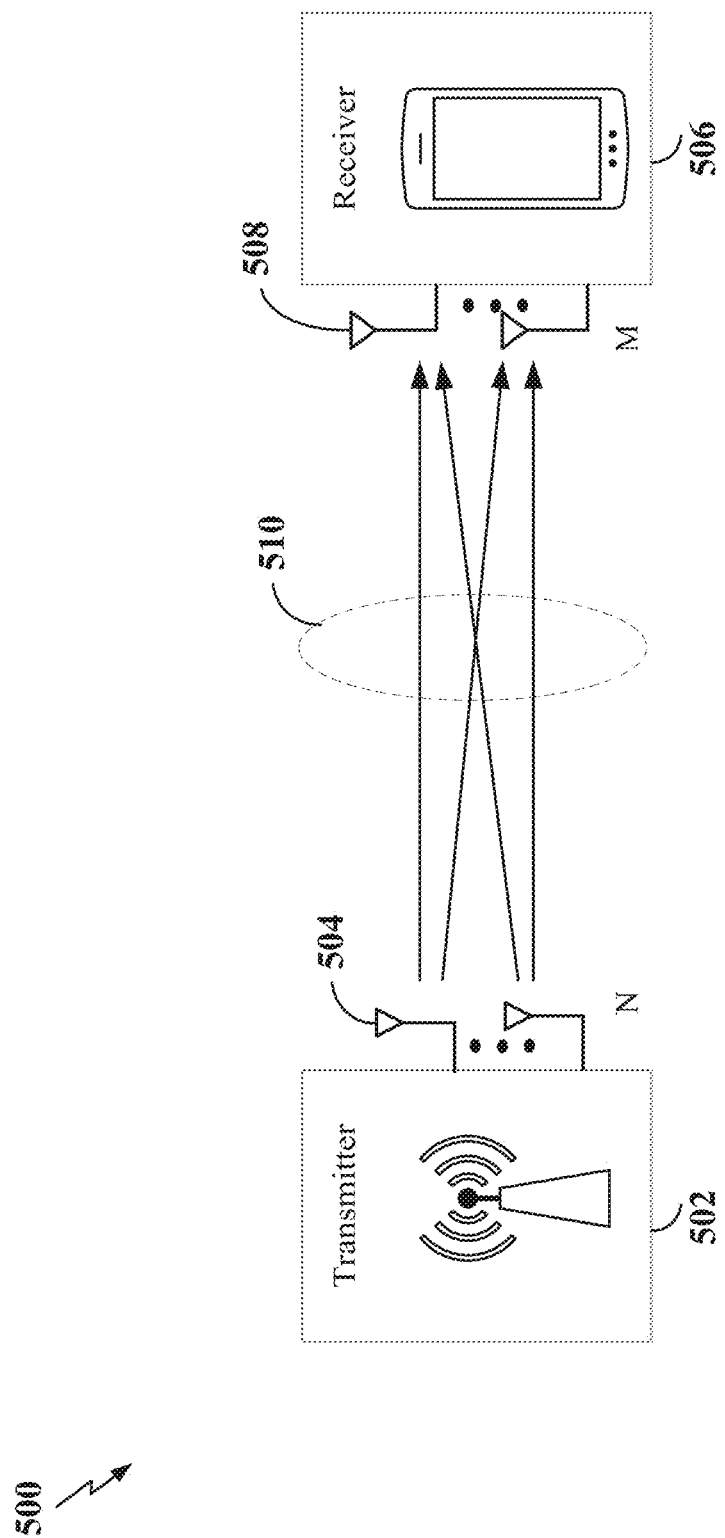
FIG. 5 is a block diagram illustrating an example of a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 5 illustrates an example of a wireless communication system 500 supporting beamforming and/or MIMO. In a MIMO system, a transmitter 502 includes multiple transmit antennas 504 (e.g., N transmit antennas) and a receiver 506 includes multiple receive antennas 508 (e.g., M receive antennas). Thus, there are N×M signal paths 510 from the transmit antennas 504 to the receive antennas 508. Each of the transmitter 502 and the receiver 506 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the wireless communication system 500 (MIMO system) is limited by the number of transmit or receive antennas 504 or 508, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 5, a rank-2 spatial multiplexing transmission on a 2×2 MIMO antenna configuration will transmit one data stream from each transmit antenna 504. Each data stream reaches each receive antenna 508 along a different signal path 510. The receiver 506 may then reconstruct the data streams using the received signals from each receive antenna 508.

Beamforming is a signal processing technique that may be used at the transmitter 502 or receiver 506 to shape or steer an antenna beam (hereinafter a beam) (e.g., a transmit beam or receive beam) along a spatial path between the transmitter 502 and the receiver 506. Beamforming may be achieved by combining the signals communicated via antennas 504 or 508 (e.g., antenna elements of an antenna array module) such that some of the signals experience constructive interference while others experience destructive interference. To create the desired constructive/destructive interference, the transmitter 502 or receiver 506 may apply amplitude and/or phase offsets to signals transmitted or received from each of the antennas 504 or 508 associated with the transmitter 502 or receiver 506.

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub-6 GHz systems.

A base station (e.g., gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlink received beams to receive signals from the base station. In some examples, to select one or more downlink transmit beams and one or more downlink receive beams for communication with a UE, the base station may transmit a reference signal, such as an SSB or CSI-RS, on each of a plurality of downlink transmit beams in a beam-sweeping manner. The UE may measure the reference signal received power (RSRP) on each of the downlink transmit beams using one or more downlink receive beams on the UE and transmit a beam measurement report to the base station indicating the RSRP of each of the measured downlink transmit beams. The base station may then select one or more serving downlink beams (e.g., downlink transmit beams and downlink receive beams) for communication with the UE based on the beam measurement report. The resulting selected downlink transmit beam and downlink receive beam may form a downlink beam pair link. In other examples, when the channel is reciprocal, the base station may derive the particular downlink beam(s) to communicate with the UE based on uplink measurements of one or more uplink reference signals, such as sounding reference signals (SRSs).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via an SRS beam sweep with measurement at the base station or by downlink beam management via an SSB/CSI-RS beam sweep with measurement at the UE. The selected uplink beam may be indicated by a selected SRS resource (e.g., time-frequency resources utilized for the transmission of a SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

Figure 6:
FIG. 6 is a diagram illustrating an example of communication between a radio access network (RAN) node and a wireless communication device using beamforming according to some aspects.

FIG. 6 is a diagram illustrating communication between a base station 604 and a UE 602 using beamformed signals according to some aspects. The base station 604 may correspond to any of the BSs (e.g., gNBs) or scheduling entities shown in any of presently disclosed FIGS. 1, 2, 5, 7-11, 13, and 14. The UE 602 may be any of the UEs or scheduled entities of FIGS. 1, 2, 5, 7-11, 13, and 14.

In the example shown in FIG. 6, the base station 604 is configured to generate a plurality of beams 606a-606h, each associated with a different beam direction. In addition, the UE 602 is configured to generate a plurality of beams 608a-608e, each associated with a different beam direction. The base station 604 and UE 602 may select one or more beams 606a-606h on the base station 604 and one or more beams 608a-608e on the UE 602 for communication of uplink and downlink signals therebetween using a downlink beam management scheme and/or an uplink beam management scheme.

In an example of a downlink beam management scheme for selection of downlink beams, the base station 604 may be configured to sweep or transmit on each of a plurality of downlink transmit beams 606a-606h during one or more synchronization slots. For example, the base station 604 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, downlink transmit beams 606a-606h transmitted during a same symbol may not be adjacent to one another. In some examples, the base station 604 may transmit more or less beams distributed in all directions (e.g., 360 degrees).

In addition, the UE 602 is configured to receive the downlink beam reference signals on a plurality of downlink receive beams 608a-608e. In some examples, the UE 602 searches for and identifies each of the downlink transmit beams 606a-606h based on the beam reference signals. The UE 602 then performs beam measurements (e.g., RSRP, SINR, RSRQ, etc.) on the beam reference signals on each of the downlink receive beams 608a-608e to determine the respective beam quality of each of the downlink transmit beams 606a-606h as measured on each of the downlink receive beams 608a-608e.

The UE 602 can generate and transmit a beam measurement report, including the respective beam index and beam measurement of each downlink transmit beam 606a-606h on each downlink receive beam 608a-608e to the base station

604. The base station 604 may then select one or more downlink transmit beams on which to transmit unicast downlink control information and/or user data traffic to the UE 602. In some examples, the selected downlink transmit beam(s) have the highest gain from the beam measurement report. In some examples, the UE 602 can further identify the downlink transmit beams selected by the base station from the beam measurements. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The base station 604 or the UE 602 may further select a corresponding downlink receive beam on the UE 602 for each selected serving downlink transmit beam to form a respective downlink beam pair link (BPL) for each selected serving downlink transmit beam. For example, the UE 602 can utilize the beam measurements to select the corresponding downlink receive beam for each serving downlink transmit beam. In some examples, the selected downlink receive beam to pair with a particular downlink transmit beam may have the highest gain for that particular downlink transmit beam.

In one example, a single downlink transmit beam (e.g., beam 606d) on the base station 604 and a single downlink receive beam (e.g., beam 608c) on the UE may form a single downlink BPL used for communication between the base station 604 and the UE 602. In another example, multiple downlink transmit beams (e.g., beams 606c, 606d, and 606e) on the base station 604 and a single downlink receive beam (e.g., beam 608c) on the UE 602 may form respective downlink BPLs used for communication between the base station 604 and the UE 602. In another example, multiple downlink transmit beams (e.g., beams 606c, 606d, and 606e) on the base station 604 and multiple downlink receive beams (e.g., beams 608c and 608d) on the UE 602 may form multiple downlink BPLs used for communication between the base station 604 and the UE 602. In this example, a first downlink BPL may include downlink transmit beam 606c and downlink receive beam 608c, a second downlink BPL may include downlink transmit beam 608d and downlink receive beam 608c, and a third downlink BPL may include downlink transmit beam 608e and downlink receive beam 608d.

When the channel is reciprocal, the above-described downlink beam management scheme may also be used to select one or more uplink BPLs for uplink communication from the UE 602 to the base station 604. For example, the downlink BPL formed of beams 606d and 608e may also serve as an uplink BPL. Here, beam 608c is utilized as an uplink transmit beam, while beam 606d is utilized as an uplink receive beam.

In an example of an uplink beam management scheme, the UE 602 may be configured to sweep or transmit on each of a plurality of uplink transmit beams 608a-608e. For example, the UE 602 may transmit an SRS on each beam in the different beam directions. In addition, the base station 604 may be configured to receive the uplink beam reference signals on a plurality of uplink receive beams 606a-606h. In some examples, the base station 604 searches for and identifies each of the uplink transmit beams 608a-608e based on the beam reference signals. The base station 604 then performs beam measurements (e.g., RSRP, SINR, RSRQ, etc.) on the beam reference signals on each of the uplink receive beams 606a-606h to determine the respective beam quality of each of the uplink transmit beams 608a-608e as measured on each of the uplink receive beams 606a-606h.

The base station 604 may then select one or more uplink transmit beams on which the UE 602 will transmit unicast downlink control information and/or user data traffic to the base station 604. In some examples, the selected uplink transmit beam(s) have the highest gain. The base station 604 may further select a corresponding uplink receive beam on the base station 604 for each selected serving uplink transmit beam to form a respective uplink beam pair link (BPL) for each selected serving uplink transmit beam. For example, the base station 604 can utilize the beam measurements to select the corresponding uplink receive beam for each serving uplink transmit beam. In some examples, the selected uplink receive beam to pair with a particular uplink transmit beam may have the highest gain for that particular uplink transmit beam.

The base station 604 may then notify the UE 602 of the selected uplink transmit beams. For example, the base station 604 may provide the SRS resource identifiers (IDs) identifying the SRSs transmitted on the selected uplink transmit beams. In some examples, the base station 604 may apply each selected uplink transmit beam (and corresponding uplink receive beam) to an uplink signal (e.g., PUCCH, PUSCH, SRS, etc.) and transmit the respective SRS resource IDs associated with the selected uplink transmit beams applied to each uplink signal to the UE 602. When the channel is reciprocal, the above-described uplink beam management scheme may also be used to select one or more downlink BPLs for downlink communication from the base station 604 to the UE 602. For example, the uplink BPLs may also be utilized as downlink BPLs.

With regard to repeaters used in communication systems such as 5G NR systems, it is noted that such repeaters may be configured as either "smart" repeaters that communicate bi-directionally with a base station, regenerative repeaters that decode and regenerate received signals, or as analog RF repeaters that do not necessarily communicate with a base station or the network. In the case of RF repeaters, these repeaters are non-regenerative type relay nodes that simply amplify (or scale) and forward all signals that they receive in the analog domain (e.g., analog repeaters). An advantage of RF repeaters is that they are lower cost than smart or regenerative repeaters and typically do not have a digital processing chain that decodes, regenerates, and/or retransmits an exact copy of the original signal, as well as communicating a base station in the case of smart repeaters. Further, RF repeaters may be beneficial for 5G NR millimeter wave (mmWave and also part of the 5G NR FR2 frequencies) deployments for providing coverage and capacity enhancements, offering ease of implementation, and not increasing latency. Additionally, densification for coverage is important for mmWave, which requires a large number of nodes. Accordingly, analog repeaters provide a cost-effective solution for densification in 5G NR mmWave systems.

Other considerations for RF repeaters include the power characteristics and the frequency spectrum that the repeaters are configured to amplify (e.g., single band, multi-band, etc.). Also, full-duplex repeaters are not normally configured for differentiating between the UL and DL transmissions. Also in mmWave systems, signals are vulnerable to blockages due to higher penetration losses and reduced diffraction. RF repeaters may amplify noise and increase noise interference (i.e., pollution) in the systems, particularly in mmWave systems.

Figure 7:
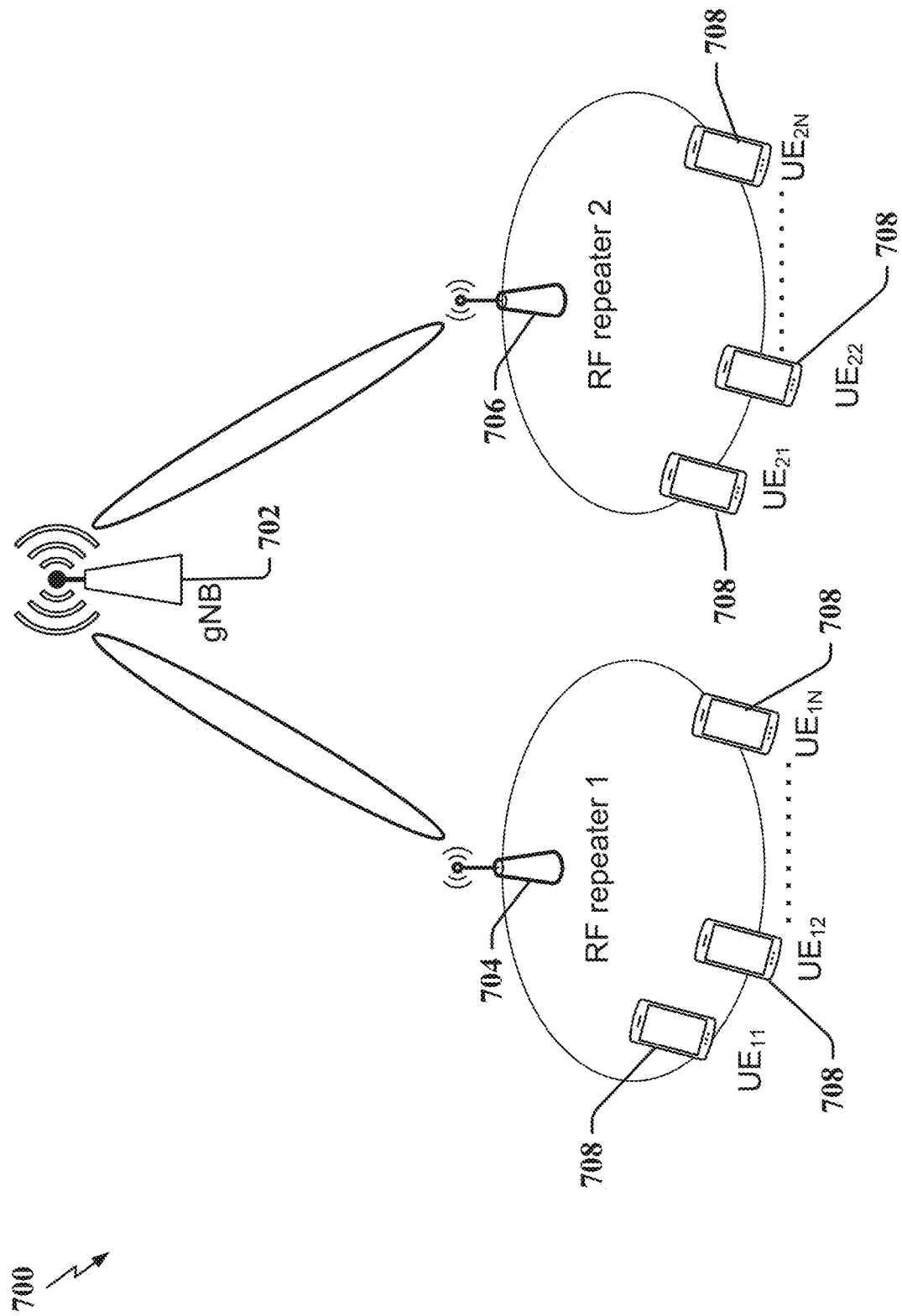
FIG. 7 is a diagram illustrating an example of an RF repeater in a wireless communication system according to some aspects.

FIG. 7 illustrates an example of a communication system 700 featuring the use of repeaters. As illustrated, the system 700 includes a network node 702, such as a gNB or base station, and analog RF repeaters 704 and 706 that each amplify and forward transmissions of the gNB 702 to some N number of UEs 708 (labeled $UE_{11}$ through $UE_{1N}$ and $UE_{21}$ through $UE_{2N}$). In an aspect, the RF repeaters 704, 706 may transmit with wide beams to reach all possible UE positions. Repeaters 704, 706 may also have corresponding receive beam configurations (spatial filters) with a wide beam setting.

If the repeater is an analog repeater, the repeater 704 or 706 may not able to optimize communications with the UEs 708. The repeater may receive communications and retransmit communications regardless of a distribution (quantity and location) of the UEs. As a result, the repeater wastes energy and provides a diminished or weaker signal to UEs that are further away. This may lead to a degradation of communications, especially for UEs that may be at a cell's edge.

FIG. 8 illustrates another example of a wireless communication system 800 that includes use of a RF repeater in the context of time division duplexed (TDD) and multi-beam operation. As shown, the wireless system 800 includes a gNB or base station 802 that utilizes beam forming and the ability to transmit via multiple beams. In this example, a particular beam 804 is used for transmission of signals (DL and UL) with an RF repeater 806. The RF repeater 806, in turn, serves to repeat signals to and from a UE 808. Typically, RF repeaters are configured to be omni-directional as illustrated by range 809, or have a fixed direction for transmitted and received signals (i.e., the repeater is not adaptive over time).

Additionally, repeaters typically are not configured to distinguish between uplink (UL) and downlink (DL) signals in TDD communications. As an illustration of TDD communication, a TDD slot/symbol timeline is shown at 810 over a DL-UL transmission time period 812, symbols/slots that are repeated by RF repeater 806 include both DL and UL slots. In the TDD example shown, full downlink slots/symbols 814 are transmitted, a mix of DL, flexible, DL symbols are transmitted during a switching or DL-to-UL transition slot(s) 816, and then full uplink slots 818 are transmitted for the remainder of the DL-UL time period 812. A simple RF repeater will not distinguish between UL slots/symbols and DL slots/symbols occurring over the DL-UL time period 812.

FIG. 9 illustrates another example of a wireless communication system 900 that includes use of a smart RF repeater in the context of time division duplexed (TDD) and multi-beam operation where the repeater may be configured to transmit/receive in an adaptive manner (e.g., spatially beam form), as well as distinguish between UL and DL transmissions in TDD. As shown, the wireless system 900 includes a gNB or base station 902 that utilizes beam forming and the ability to transmit via multiple beams. In this example, a particular beam 904 is used for transmission of signals (DL and UL) with a smart repeater 906. The smart repeater 906, in turn, serves to repeat signals to and from a UE 908. In this example, the smart repeater 906 may be configured to adaptively direct transmit and receive transmissions using various beams of multiple beams. Thus, a particular beam 910 could be utilized for communications with the UE 908. Additionally, the smart repeater 906 may be fully aware of DL and UL transmissions in a TDD period 912, such as the DL symbols/slots 914, the switching slot(s) 916, and the UL symbols/slots 918.

Figure 10:
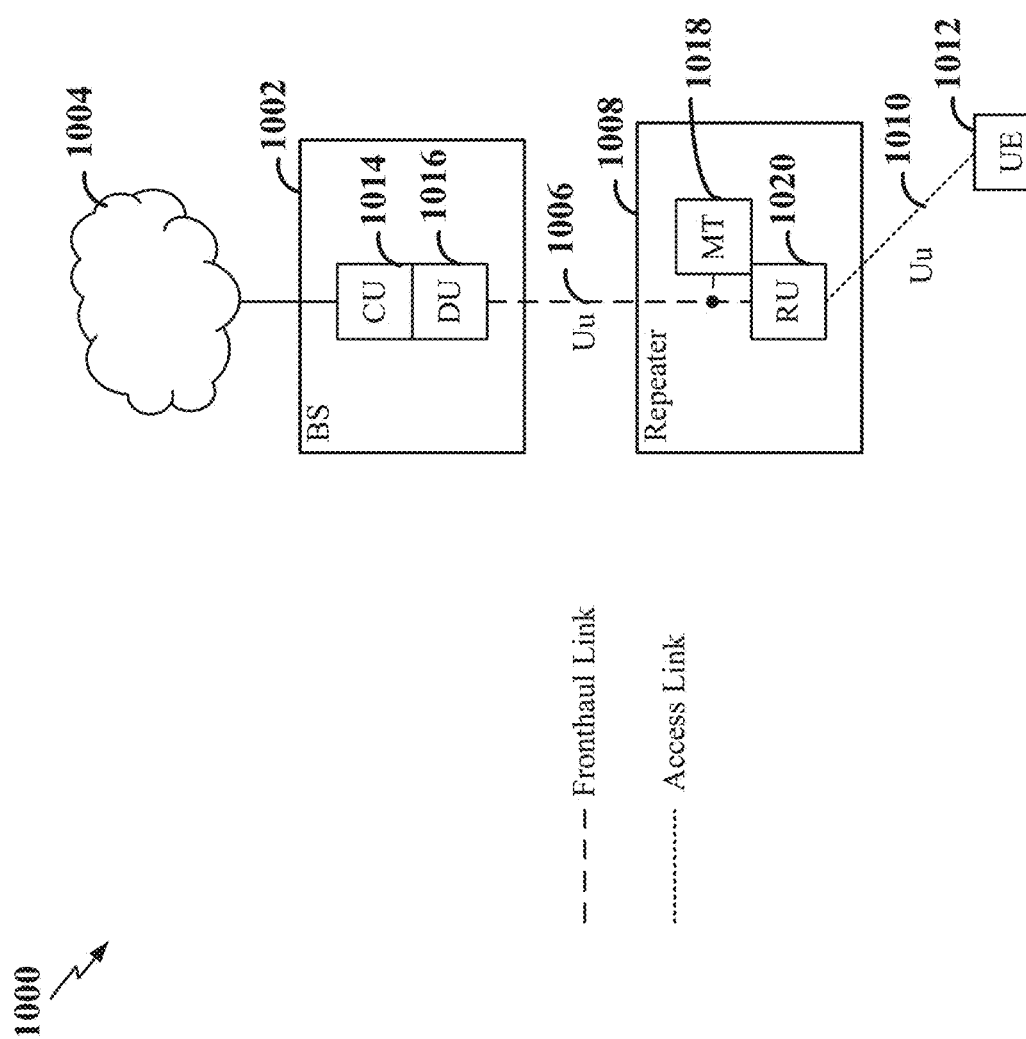
FIG. 10 is a diagram illustrating an example of a repeater device in a wireless communication system according to some aspects.

Additionally, it is noted that smart repeaters, such as repeater 906, may be configured with in-band control by the gNB (e.g., gNB 902). As an example, FIG. 10 illustrates a wireless communication network 1000. In this illustration, a network entity such as a base station (BS) 1002 is coupled to a remote network 1004, such as a main backhaul network or mobile core network. In the network 1000, wireless spectrum may be used for a fronthaul link (FH link) 1006 between the base station 1002 and a repeater device 1008 and for an access link (AL) 1010 between the repeater device 1008 and a UE 1012. The FH link 1006 and the AL 1010 may each be conducted over a Uu radio interface or some other suitable wireless communication interface. In some examples, the wireless spectrum may utilize millimeter-wave (mmWave) frequencies or sub-6 GHz carrier frequencies in other examples.

The wireless communication network 1000 may include other base stations, UEs, and repeater devices (not shown). The base station 1002 and other base stations may correspond to any of the BSs (e.g., gNBs) or scheduling entities shown in any of FIGS. 1, 2, 5, 7-11, 13, and 14 discussed herein. The repeater device 1008 and other repeater devices may be similar to any repeater device described herein, such as, for example, any of the repeater devices of FIGS. 7-15 discussed herein. A repeater device may also be referred to as a repeater, a relay, a relay device, and the like. The UE 1012 and other UEs may be similar to, for example, any of the UEs or scheduled entities of FIGS. 1, 2, 5, 7-11, 13, and 14.

In the example of FIG. 10, the base station 1002 may be referred to as a donor node since the base station 1002 provides a communication link to the remote network 1004. A donor node may include, for example, a wired (e.g., fiber, coaxial cable, Ethernet, copper wires), microwave, or another suitable link to the remote network 1004.

The base station 1002 may be an enhanced gNB including functionality for controlling the network 1000. In some examples, the base station 1002 may include a central unit (CU) 1014 and a distributed unit (DU) 1016. The CU 1014 is configured to operate as a centralized network node (or central entity) within the network 1000. For example, the CU 1014 may include radio resource control (RRC) layer functionality and packet data convergence protocol (PDCP) layer functionality to control/configure the other nodes (e.g., repeater devices and UEs) within the network 1000. In some aspects, RRC signaling may be used for various functions including, as one example, setting up and releasing user data bearers. In some examples, RRC signaling messages may be transported over signaling bearers (e.g., SRB 1 and SRB 2).

The DU 1016 is configured to operate as a scheduling entity to schedule scheduled entities (e.g., repeater devices and/or UEs) of the base station 1002. For example, the DU 1016 may operate as a scheduling entity to schedule the repeater device 1008 and the UE 1012. In some examples, the DU 1016 may include radio link control (RLC), medium access control (MAC), and physical (PHY) layer functionality to enable operation as a scheduling entity.

An F1 interface provides a mechanism to interconnect the CU 1014 (e.g., PDCP layer and higher layers) and the DU 1016 (e.g., RLC layer and lower layers). In some aspects, an F1 interface may provide control plane and user plane functions (e.g., interface management, system information management, UE context management, RRC message transfer, etc.). F1AP is an application protocol for F1 that defines signaling procedures for F1 in some examples. The F1 interfaces support F1-C on the control plane and F1-U on the user plane.

To facilitate wireless communication between the base station 1002 and the UEs (e.g., the UE 1012) served by the base station 1002, the repeater device 1008 may be configured to operate as a scheduled entity. The repeater device 1008 may include a mobile termination (MT) unit 1018 to enable scheduled entity functionality. For example, the MT unit 1018 may include UE functionality to connect to the base station 1002 and to be scheduled by the base station 1002. The repeater device 1008 also includes a repeating unit 1020 that relays signals between the base station 1002 and the UE 1012.

Figure 11:
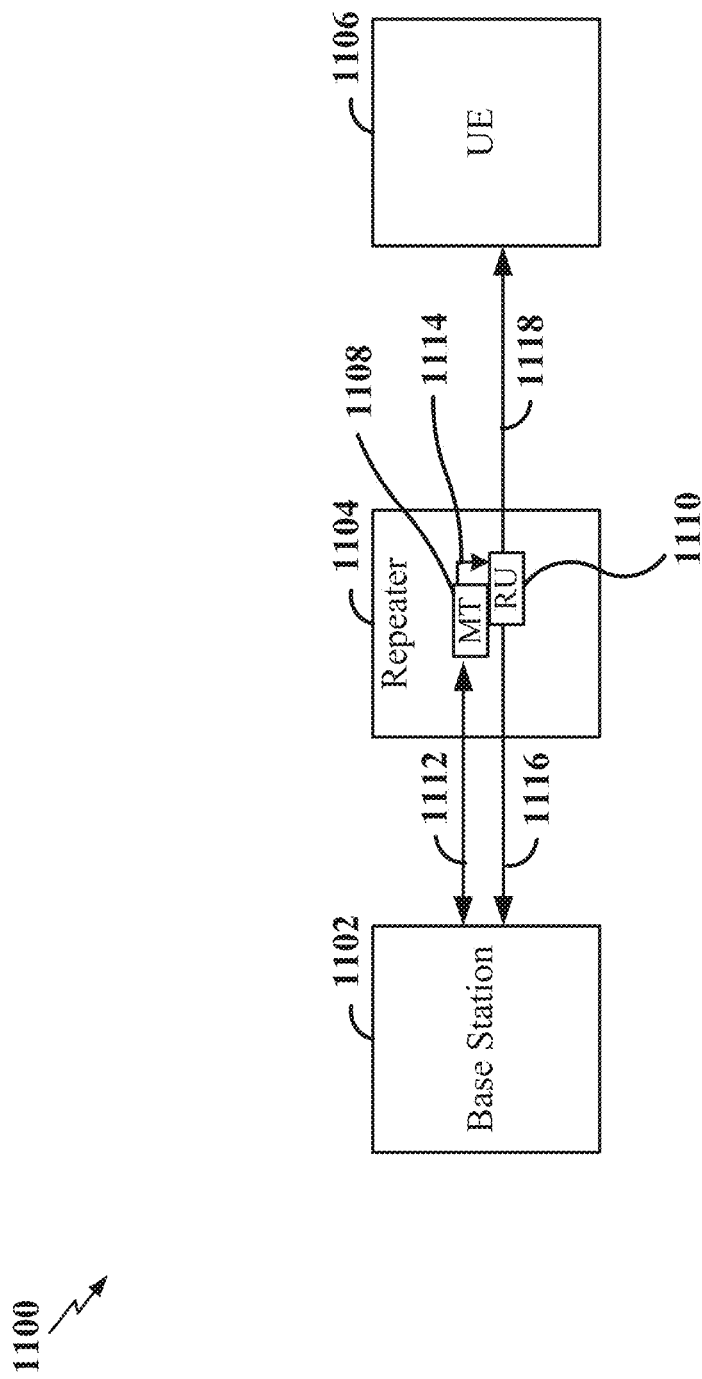
FIG. 11 is a block diagram illustrating example components and communication links of a repeater device according to some aspects.

FIG. 11 illustrates an example of a wireless communication network 1100 including a base station 1102, a repeater device 1104, and a UE 1106. The base station 1102 may be similar to, for example, the base stations or scheduling entities shown in any of FIGS. 1, 2, 5, 7-11, 13, and 14. The repeater device 1104 may be similar to any repeater device described herein, such as, for example, any of the repeater devices of FIGS. 7-15. The UE 1106 may be similar to, for example, any of the UEs or scheduled entities of FIGS. 1, 2, 5, 7-11, 13, and 14.

Millimeter wave communications have a higher frequency and shorter wavelength than other types of radio waves used for communications (e.g., sub-6 GHz communications). Consequently, millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a base station that communicates using the sub-6 GHz radio waves. However, a millimeter wave might not be capable of penetrating the same wall (e.g., depending on a thickness of the wall, a material from which the wall is constructed, and/or the like). Thus, a repeater device may be used to increase the coverage area of a base station, to extend coverage to UEs without line of sight to the base station (e.g., due to an obstruction), and/or the like.

For example, an obstruction between a UE and a base station may block or otherwise reduce the quality of a link between the base station and the UE. However, a repeater device may be placed so that there are no obstructions or fewer obstructions between the repeater device and the UE and between the repeater device and the base station. Thus, communications between the base station and the UE via the repeater device may have a higher quality than communications directly between the base station the UE.

In some examples, a repeater device may perform directional communication by using beamforming to communicate with the base station via a first beam pair (e.g., a fronthaul link beam pair) and to communicate with a UE via a second beam pair (e.g., an access link beam pair). The term "beam pair" may refer to a transmit (Tx) beam used by a first device for transmission and a receive (Rx) beam used by a second device for reception of information transmitted by the first device via the Tx beam.

Referring to FIG. 11, repeater device 1104 includes an MT unit 1108 and an RU 1110 as discussed above in conjunction with FIG. 10. The MT unit 1108 communicates with the base station 1102 via a fronthaul link 1116. In some examples, the fronthaul link 1116 may implement a reduced functionality Uu interface that may be modified to support repeater device functionality. The fronthaul link 1116 provides a control path 1112 between the MT unit 1108 and the base station 1102 (e.g., a DU in the base station 1102, not shown but similar to DU 1016 shown in FIG. 10). In some examples, the control path 1112 carries UL and DL signals to configure the repeater device 1104, which may also be referred to herein as "side control information" wherein the repeater device 1104 is above to receive control configuration information apart from the fronthaul link 1116. The control path 1112 may be implemented using a relatively small BWP that is in-band with the BWPs allocated for UL transmission and/or DL transmission between the base station 1102 and the UE 1106. In some examples, the fronthaul link 1116 may operate within the FR2 frequency range.

The RU 1110 provides relaying (e.g., reception, amplification, and transmission) functionality to enable signals from the base station 1102 to reach the UE 1106 and/or to enable signals from the UE 1106 to reach the base station 1102. In some examples, the RU 1110 is an analog pass-through device (e.g., without store and forward capability). In other examples, the RU 1110 may include store and forward functionality. Signals to and from the base station 1102 are carried over a data of the fronthaul link 1116 and an access link 1118. The access link 1118 provides a data path that carries analog UL signals and DL signals to and from the UE 1106. In some examples, the access link 1118 may operate at the FR2 frequency range.

The RU 1110 and the access link 1118 may be controlled by the base station 1102 (e.g., by a DU in the base station 1102, not shown but similar to DU 1016 shown in FIG. 10). For example, the base station 1102 may schedule UL transmissions and DL transmissions on the access link 1118 (e.g., by transmitting control information to the UE 1106). In addition, the base station 1102 may control the operation of the RU through the MT unit 1108. For example, the base station 1102 may configure the MT unit 1108 via the control path described above to cause the MT unit 1108 to configure the RU 1110. To this end, the MT unit 1108 may generate control signaling carried by a signal path 1114 for controlling the operation of the RU 1110.

Figure 12:
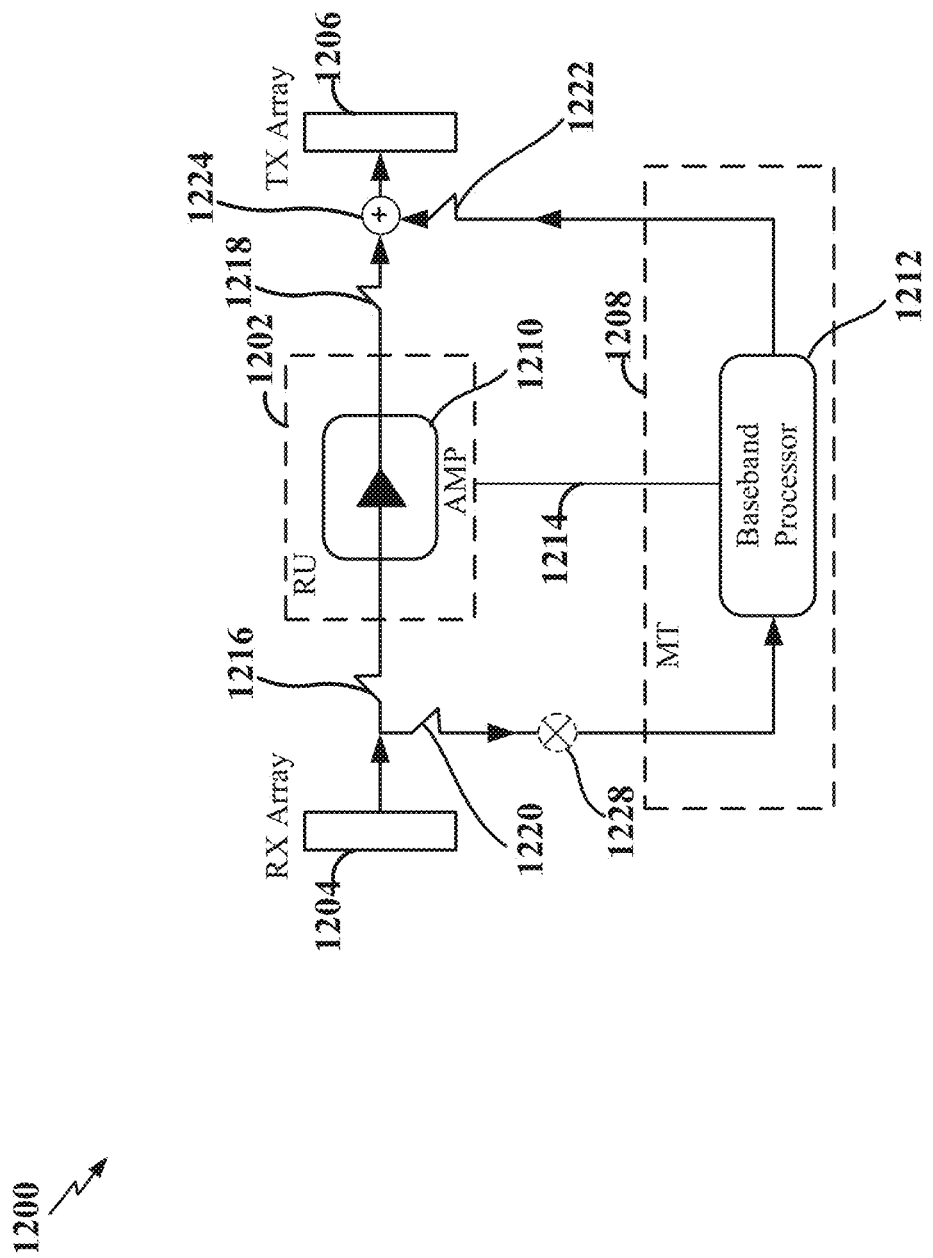
FIG. 12 is a schematic diagram illustrating example components of a repeater device according to some aspects.

FIG. 12 is a diagram illustrating another example of a repeater device 1200. The repeater device 1200 may correspond to any of the repeater devices described herein in FIGS. 7-15. In some examples, the repeater device 1200 may be a millimeter wave repeater device that communicates via millimeter wave transmissions (e.g., as opposed to sub-6 GHz transmissions).

The repeater device 1200 may include a relay unit (RU) 1202, one or more antenna arrays (or antennas, antenna panels, and/or the like) such as a receive (Rx) array 1204 and a transmit (Tx) array 1206, and an MT unit 1208 as discussed herein. The RU 1202 includes an amplifier 1210 for amplifying signals received via the receive array 1204 and transmitting the amplified signals via the transmit array 1206. The mobile termination (MT) unit 1208 includes a baseband processor 1212 for processing signals received from a base station (not shown) over a control path as discussed above, controlling the operation of the RU 1202 as necessary (e.g., via control signaling 1214), and transmitting signals to the base station via the control path.

An antenna array such as array 1204 or 1206 may include multiple antenna elements capable of being configured for beamforming. An antenna array may be referred to as a phased array because phase values and/or phase offsets of the antenna elements may be configured to form a beam, with different phase values and/or phase offsets being used for different beams (e.g., in different directions). In some aspects, an antenna array may be a fixed receive (Rx) antenna array capable of only receiving communications while not transmitting communications. In some aspects, an antenna array may be a fixed transmit (Tx) antenna array capable of only transmitting communications while not receiving communications. In some aspects, an antenna array may be configured to act as an Rx antenna array or a Tx antenna array (e.g., via a Tx/Rx switch, a MUX/DE-MUX, and/or the like). An antenna array may be capable of communicating using millimeter waves and/or other types of RF analog signals.

The amplifier 1210 includes one or more components capable of amplifying an input signal and outputting an amplified signal. For example, the amplifier 1210 may include a power amplifier, a variable gain component, and/or the like. In some aspects, amplifier 1210 may have variable gain control. In some examples, the level of amplification of the amplifier 1210 may be controlled by the baseband processor 1212 (e.g., under the direction of the base station).

The baseband processor 1212 includes one or more components capable of controlling one or more other components of repeater device 1200. For example, the baseband processor 1212 may include a controller, a microcontroller, a processor, and/or the like. In some aspects, the baseband processor 1212 may control a level of amplification or gain applied by the amplifier 1210 to an input signal. Additionally, or alternatively, the baseband processor 1212 may control an antenna array by controlling a beamforming configuration for the antenna array (e.g., one or more phase values for the antenna array, one or more phase offsets for the antenna array, one or more power parameters for the antenna array, one or more beamforming parameters for the antenna array, a Tx beamforming configuration, an Rx beamforming configuration, and/or the like), by controlling whether the antenna array acts as a receive antenna array or a transmit antenna array (e.g., by configuring interaction and/or connections between the antenna array and switches), and/or the like. Additionally, or alternatively, the baseband processor 1212 may power on or power off one or more components of repeater device 1200 (e.g., when a base station does not need to use the repeater device to serve UEs). In some aspects, the baseband processor 1212 may control timing of one or more of the above configurations.

The baseband processor 1212 may include a component capable of communicating with a base station via the control path. In some aspects, the baseband processor 1212 may communicate with the base station using one or more in-band radio frequencies (e.g., radio frequencies that are included within an operating frequency bandwidth of the antenna arrays). In this case, the base station may configure a BWP within the operating frequency bandwidth of the antenna arrays (e.g., an in-band BWP) such that the BWP carries the control interface associated with the repeater device 1200.

In some examples, the baseband processor 1212 may include one or more components for digital signal processing (e.g., digital signal processor, a baseband processor, a digital-to-analog converter (DAC), an analog-to-digital converter (ADC), and/or the like). In this way, the baseband processor 1212 may demodulate, decode, and/or perform other types of processing on the control information received from a base station.

Switches 1216, 1218, 1220, and 1222 include one or more components capable of enabling the repeater device 1200 to either relay a signal received via a receive antenna array or to transmit an RF analog signal generated by the repeater device 1200 (e.g., generated by the MT unit 1208). For example, in one configuration, the switches 1216, 1218, 1220, and 1222 may be configured to couple the RU 1202 to the receive array 1204 and the transmit array 1206. In another configuration, the switches 1216, 1218, 1220, and 1222 may be configured to couple the MT unit 1208 to the receive array 1204 and the transmit array 1206. In some examples, the position of each of the switches 1216, 1218, 1220, and 1222 may be controlled by the MT unit 1208.

Switches (not shown) may be used to multiplex and/or demultiplex communications received from and/or transmitted to an antenna array. For example, switches (e.g., multiplexer/demultiplexers) may be used to switch an Rx antenna array to a Tx antenna array, or vice versa.

A summing device 1224 (e.g., a multiplexer) may include functionality to combine signals from the amplifier 1210 with signals from the MT unit 1208. For example, signals for the data path may be provided on the frequency bands for the BWPs allocated for data transmission, while signals for the control path may be provided on the frequency band(s) for the BWP allocated for control transmission. A demultiplexer 1228 could be used in some examples (e.g., to demultiplex the control path from an incoming signal).

Figure 13:
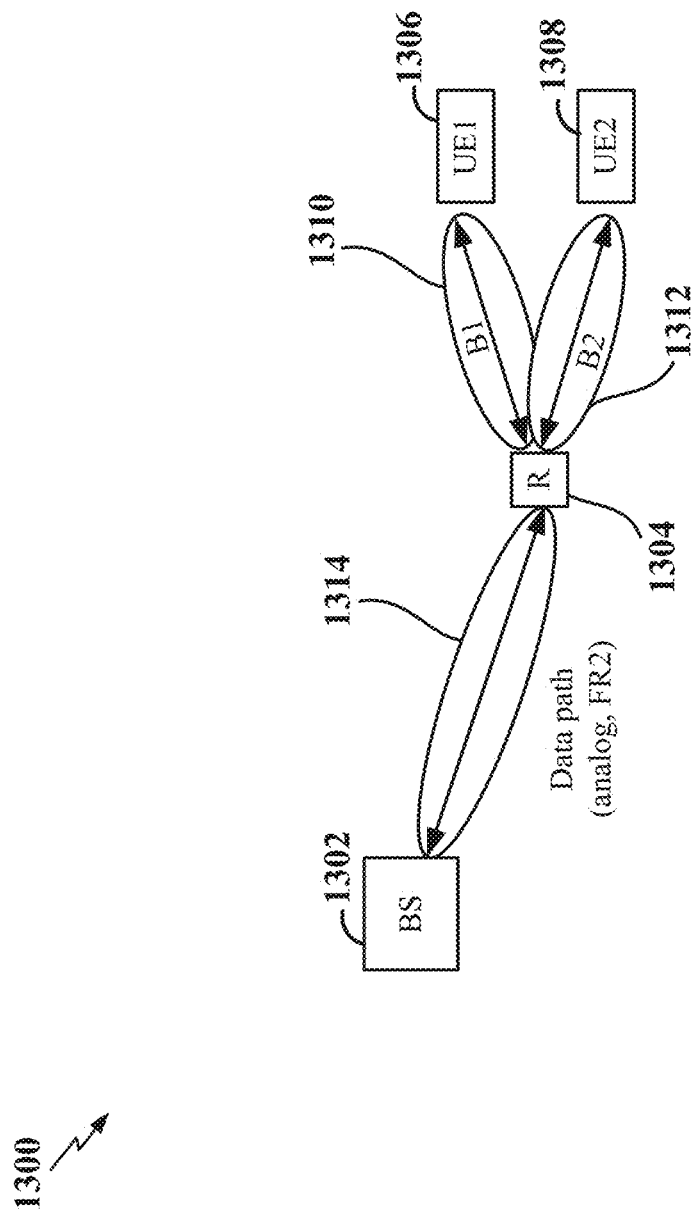
FIG. 13 is a conceptual illustration of an example of signaling paths for a repeater device according to some aspects.

In further aspects, a repeater device may relay signals to and from multiple UEs. FIG. 13 illustrates an example of a wireless communication network 1300 that includes a base station (BS) 1302, a repeater device (R) 1304, a first UE 1306, and a second UE 1308. The base station 1302 may be similar to, for example, and of the base stations or scheduling entities shown in any of FIGS. 1, 2, 5, 7-11, 13, and 14. The repeater device 1304 may be similar to any repeater device described herein, such as, for example, any of the repeater devices of FIGS. 7-15. The UEs 1306 or 1308 may be similar to, for example, any of the UEs or scheduled entities of FIGS. 1, 2, 5, 7-11, 13, and 14.

Additionally, the repeater device 1304 may established a first beam pair 1310 to the first UE 136 and a second beam pair 1312 to the second UE 1308. The base station 1302 and the repeater device 1304 may communicate via a beam path 1314 where data is sent to and/or received from base station 1302.

As discussed above, repeater devices such as smart repeaters can acquire the mentioned side control information via a control-interface (e.g., 1112 in FIG. 11) to a gNB or some other control node in the network. Accordingly, this type of repeater involves establishing a communication link between the repeater and base station or gNB in a manner or processes similar to a UE acquiring cell access. This type of repeater implementation becomes complex and may, in practice, require a UE modem incorporated into the repeater. Additionally, the operation of the repeater will be managed and configured by the base station or gNB, adding extra work and overhead for the base station or gNB. Accordingly, in some examples disclosed herein, an analog or RF repeater may be configured to learn beamforming configurations without having to establish a link to the base station or gNB (i.e., still maintaining an analog repeater operation). Accordingly, such repeaters may be able to gain at least some of the performance benefits of the smart repeaters, but without the extra overhead and complexity involved with smart repeaters and having to establish a separate control interface with the base station or gNB.

An analog or RF repeater may have a broad beam on both the fronthaul link and access link sides. Additionally, a repeater may be configurable (e.g., manually configurable by a user) at the time of initial deployment (or afterward) for proper placement with respect to a gNB and an optimal or proper fronthaul beam configuration may also be set. According to various aspects disclosed herein, an analog or RF repeater may be further configured to be able to autonomously determine an appropriate or optimal beam forming configuration based on measurements of received signals. In particular, a repeater may be configured to measure the received power for a number of different spatial directions. That is, the repeater may be configure to scan different directions using different receive beamforming configurations, and the measure the received power in each of those different directions. Based on the result of the scan and measured powers, the repeater may be configured to then select a beamforming configuration for the fronthaul link communication with the base station or gNB, for example.

Figure 14:
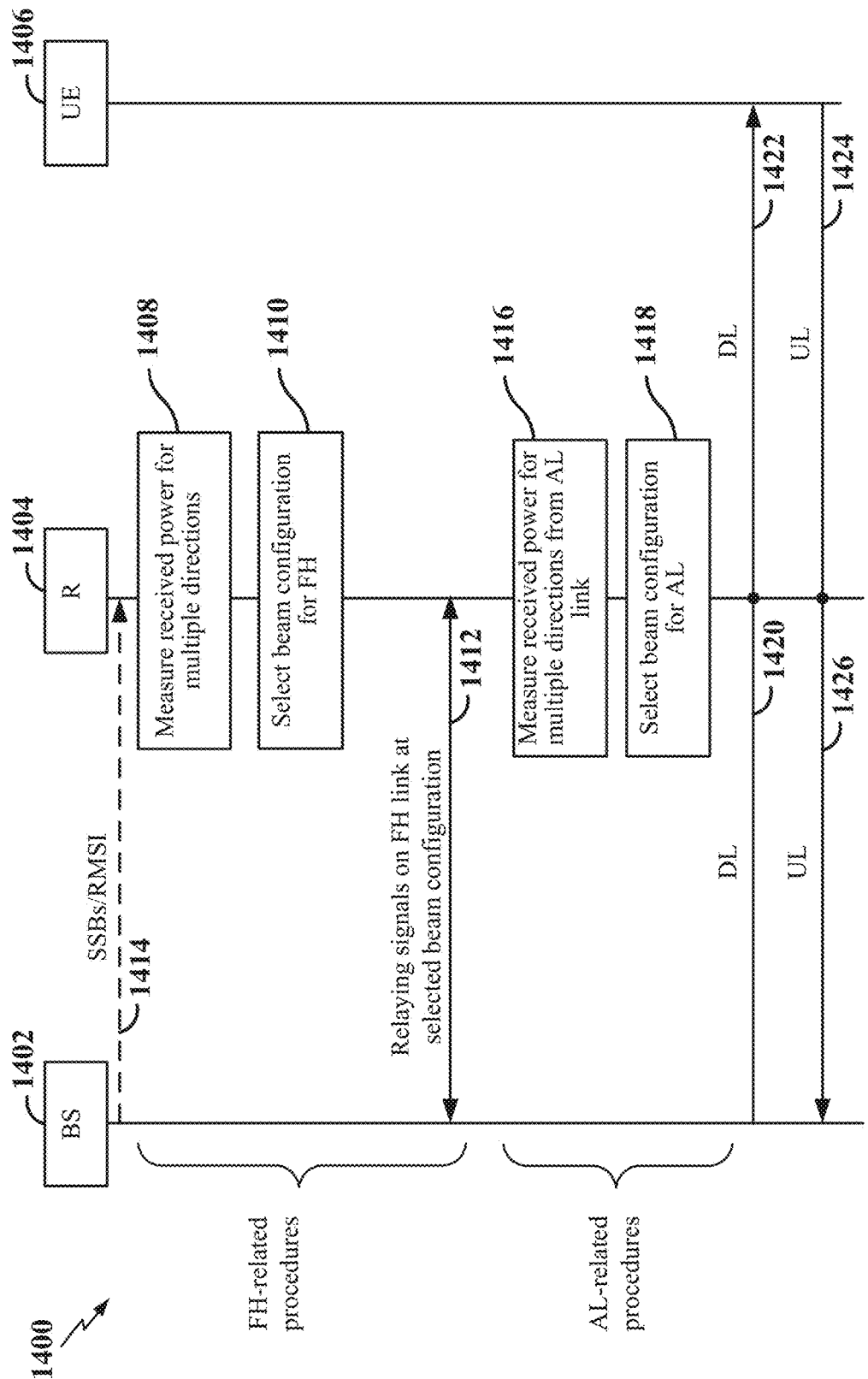
FIG. 14 is a call flow diagram illustrating an example of repeater device signaling according to some aspects.

FIG. 14 illustrates a call flow diagram 1400 illustrating signaling in a wireless communication network including a base station (BS) 1402, a repeater device "R" 1404, and a UE 1406. The base station 1402 may be similar to, for example, and of the base stations or scheduling entities shown in any of FIGS. 1, 2, 5, 7-11, 13, and 14. The repeater device 1404 may be similar to any repeater device described herein, such as, for example, any of the repeater devices of FIGS. 7-15. The UE 1406 may be similar to, for example, any of the UEs or scheduled entities of FIGS. 1, 2, 5, 7-11, 13, and 14. Additionally, the repeater device 1404 may be configured as an analog or RF repeater device that does not establish a control link with the base station 1402. Furthermore, the repeater device 1404 may be equipped with a power detector that is configured to measure a total received power (e.g., analog power), either for signals from the BS 1402 or the UE 1406, as will be discussed later.

As illustrated at block 1408, the repeater device 1404 may include a process of measuring the received power from multiple directions (e.g., multiple received beam configurations). This process in block 1408 may be accomplished through scanning or beam sweeping through multiple spatial directions and measuring the signal power with a power detector at each beam direction. After measuring the power at each of the multiple directions, the repeater device 1404 may be configured to then select a receive beam configuration for the fronthaul link between the BS 1402 and the repeater device 1404 to optimize signal reception without the need for control communication between the BS 1402 and repeater device 1404.

In one example, the repeater device 1404 may determine the total received analog power at each beam direction/configuration in the processes of block 1408 and then determine the beam direction/configuration for the fronthaul link based on the direction having the greatest measured total received analog power. In further aspects, the processes of block 1408 may further include the repeater device 1404 being enabled to configure a frequency and/or bandwidth for the received signals to measure the received power more accurately. In a particular aspect, the repeater device 1404 may be able to configure a center frequency and the bandwidth, and then process the received signals in the intermediate frequency (IF) or even in baseband frequency to determine power for each beam configuration. In other aspects, repeater device 1404 may measure the received power over a narrower bandwidth. In still other aspects, the repeater device 1404 may be configured to scan different frequency candidates (i.e., different center frequencies and/or bandwidths).

Moreover, the repeater device 1404 may scan around known synchronization raster locations, which are those frequencies and/or beam configurations where the gNB is known to send periodic synchronization signal blocks (SSBs) or remaining minimum system information (RMSI) (e.g., 1414), which may be detectable in the repeater device 1404 in some examples, but not processed or decoded. Additionally, the repeater device 1404 may select a duty cycle of the receive beam scan based on the periodicity of the SSB signals (e.g., 20 msec for SSBs). For example, the repeater device 1404 may scan using a first received beam for the periodicity of the SSBs signals (e.g., scan at least 20 msec) before checking another receiver beam. The repeater device 1404 may search for the periodic bursts (i.e., SSB bursts) and then decide on or select a beam configuration based on the measured power within such bursts. It is noted that outside of these bursts there could be UL transmissions by the UEs that may lead to an inaccurate FH receive beam measurement.

After the beam configuration is selected for the FH link, the signals received from the base station 1402 (and also reverse signals from the UE 1406 to be relayed to the base station 1402) are received at the particular beam configuration as illustrated by communications 1412.

In further aspects, the repeater device 1404 may also be configured to find a proper beam for transmissions to and from a UE (UE 1406) on the service side or access link (AL). In one example, after the repeater device 1404 has selected a beam configuration for the FH link, the repeater device 1404 may then scan over multiple directions to determine received power to determine a beam configuration for the AL as shown at 1416. In further examples, the scan for AL beam configuration candidates may exclude the beam direction of the FH link selected as the likelihood that the UE is between repeater device 1404 and the base station 1402 is low (and also that the need for a repeater for the UE is less). In other aspects, rather than scanning again for beam configurations for the AL, the repeater device may instead reuse the previous scan results from block 1408, for example, in order to identify optimal beam directions for the AL. After determining the measured power in the various directions, a beam configuration is selected for the AL with one or more UEs as shown in block 1418.

When determining beam directions for the AL, the repeater device 1404 may also rule out particular beam directions based on various parameters that could indicate blockage of a direction or that coverage extension in a particular direction is not necessary. For example, if no signal (or a very low received power that is less than a first predetermined threshold) is detected for a direction for an extended period of time, it is likely that that direction is blocked, and no UE will show up in that direction. Accordingly, the repeater may be able to avoid or rule out this direction for coverage. In another example, if strong signals are detected (i.e., a high received power greater than a second predetermined threshold) in a direction, this high power could be an indication that: (1) there is no need to extend the coverage in that direction; and/or (2) there is another network node (gNB/repeater) in that direction to which the repeater device 1404 may cause excessive interference. Again in such instance, the repeater device 1404 may be configured to rule out or avoid this direction for selection of the AL beam direction (i.e., the AL beamforming configuration).

According to further aspects, it is noted that as part of initial FH beam scan in block 1408, for example, the repeater device 1404 may acquire rough information about the location of the gNB's transmission bursts (e.g., SSBs/RMSI). The repeater device 1404 may then be configured to use the measured power outside these identified bursts (since the bursts are very likely associated with DL signals) for use in selecting the AL beamforming configuration.

Once beam configuration selections are made (i.e., either block 1410 and/or 1416), DL signals 1420 on the FH link are received from the base station 1402 using the selected receive beam configuration and, in turn, are relayed to the UE on the AL DL 1422 (and may be transmitted using the selected AL beam configuration in some examples). Likewise, UL signals from the UE 1406 to BS 1402 are received via the selected AL beam configuration as shown at 1424 and then relayed to the base station 1402 on the FH link (which may be the selected beam configuration as the receive beam configuration) as shown at 1426.

Figure 15:
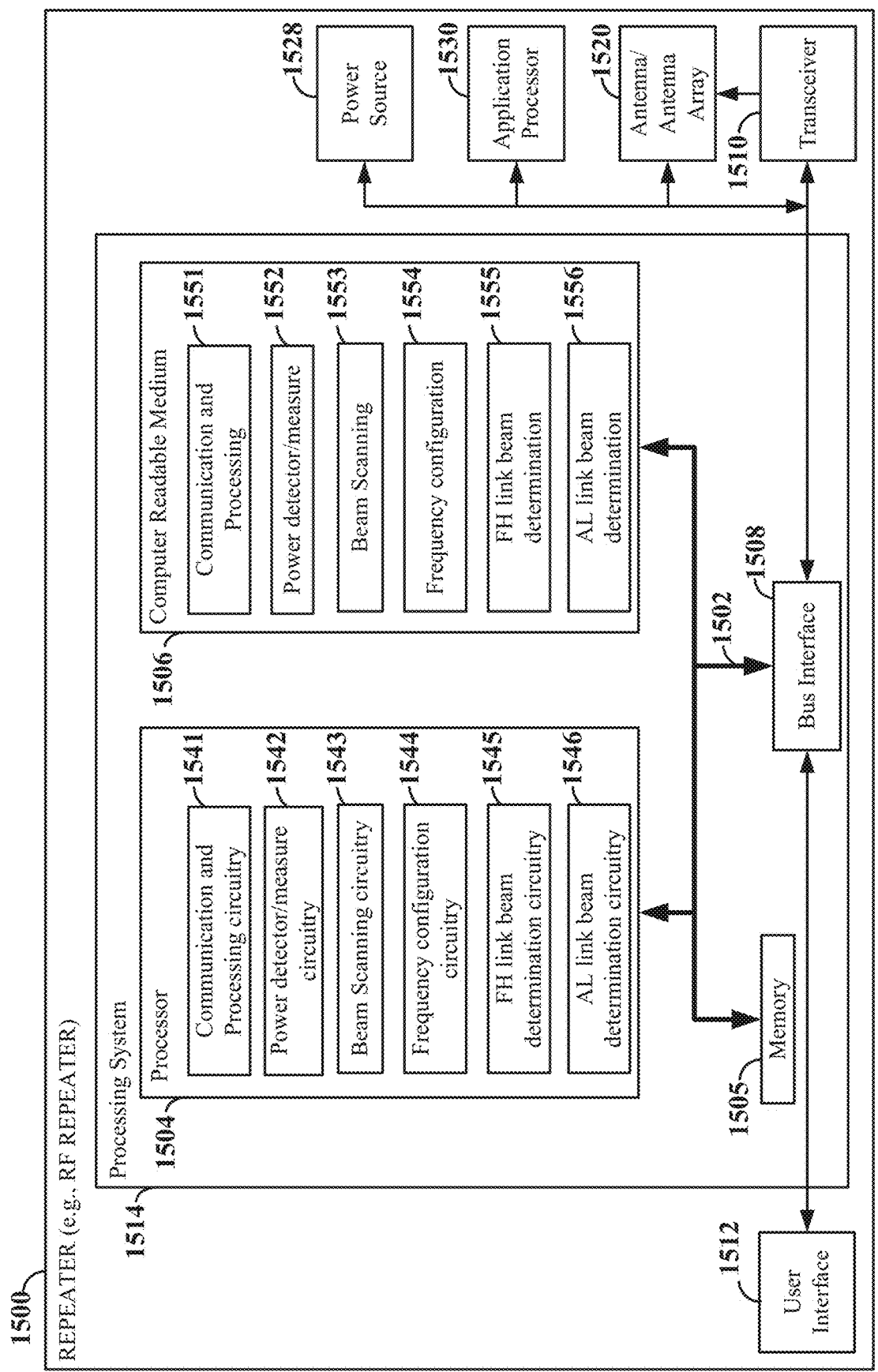
FIG. 15 is a block diagram illustrating an example of a hardware implementation of repeater device employing a processing system according to some aspects.

FIG. 15 is a block diagram illustrating an example of a hardware implementation of repeater device 1500 (e.g., an analog RF repeater device as described herein) employing a processing system 1514 according to some aspects of the disclosure. The repeater device 1500 may be any repeater device as illustrated in any one or more of FIGS. 7-15.

In accordance with various aspects of the disclosure, an element, or any portion of an element, or any combination of elements may be implemented with the processing system 1514 that includes one or more processors, such as processor 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the repeater device 1500 may be configured to perform any one or more of the functions described herein. That is, the processor 1504, as utilized in the repeater device 1500, may be used to implement any one or more of the methods or processes described and illustrated, such as those described in connection with FIGS. 16 and 17.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, will not be described any further.

A bus interface 1508 provides an interface between the bus 1502 and a transceiver 1510. The transceiver 1510 may be, for example, a wireless transceiver. The transceiver 1510 provides a means for communicating with various other apparatus over a transmission medium (e.g., air interface). The transceiver 1510 may further be coupled to one or more antennas/antenna array/antenna module 1520. The bus interface 1508 further provides an interface between the bus 1502 and a user interface 1512 (e.g., keypad, display, touch screen, speaker, microphone, control features, etc.). Of course, such a user interface 1512 is optional, and may be omitted in some examples. In addition, the bus interface 1508 further provides an interface between the bus 1502 and a power source 1528, and between the bus 1502 and an application processor 1530, which may be separate from a modem (not shown) of the repeater device 1500 or processing system 1514.

One or more processors, such as processor 1504, may be responsible for managing the bus 1502 and general processing, including the execution of software stored on the computer-readable medium 1506. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 1506. The software, when executed by the processor 1504, causes the processing system 1514 to perform the various processes and functions described herein for any particular apparatus.

The computer-readable medium 1506 may be a non-transitory computer-readable medium and may be referred to as a computer-readable storage medium or a non-transitory computer-readable medium. The non-transitory computer-readable medium may store computer-executable code (e.g., processor-executable code). The computer executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product or article of manufacture. By way of example, a computer program product or article of manufacture may include a computer-readable medium in packaging materials. In some examples, the computer-readable medium 1506 may be part of the memory 1505. Those skilled in the art will recognize how best to implement the described functionality presented throughout this disclosure depending on the particular application and the overall design constraints imposed on the system. The computer-readable medium 1506 and/or the memory 1505 may also be used for storing data that is manipulated by the processor 1504 when executing software.

In some aspects of the disclosure, the processor 1504 may include communication and processing circuitry 1541 configured for various functions, including receiving, amplifying, and forwarding signals. In some examples, the communication and processing circuitry 1541 may include one or more hardware components that provide the physical structure that performs processes related to wireless communication (e.g., signal reception and/or signal transmission). In addition, the communication and processing circuitry 1541 may be configured to receive and relay uplink traffic and uplink control messages (e.g., similar to uplink traffic 216 and uplink control 218 of FIG. 2) and transmit relayed downlink traffic and downlink control messages (e.g., similar to downlink traffic 212 and downlink control 214 of FIG. 2) via the antennas/antenna array/antenna module 1520 and the transceiver 1510. The communication and processing circuitry 1541 may further be configured to execute communication and processing software 1551 stored on the computer-readable medium 1506 to implement one or more functions described herein.

In some aspects of the disclosure, the processor 1504 may include power detector and/or measurement circuitry 1542 configured for various functions, including, for example, detecting and measuring the received power from a base station (or UE). In some examples, the power detector and/or measurement circuitry 1542 may include one or more hardware components that provide the physical structure that performs processes related to analog power detection and measurement. The power detector and/or measurement circuitry 1542 may further be configured to execute power detector and/or measurement software or instructions 1552 stored on the computer-readable medium 1506 to implement one or more functions described herein.

In some aspects of the disclosure, the processor 1504 may include beam scanning circuitry 1543 configured for various functions, including, for example, scanning across multiple beam configurations for measurement of received power at each of the beam configurations. In further aspects, beam scanning circuitry 1543 may operate cooperatively with power detection/measurement circuitry 1542 such that the repeater scans across multiple beam configurations and measures the received power for each beam configuration. In some examples, the beam scanning circuitry 1543 may include one or more hardware components that provide the physical structure that performs processes related to beam scanning over multiple beam locations. The beam scanning circuitry 1543 may further be configured to execute beam scanning software or instructions 1553 stored on the computer-readable medium 1506 to implement one or more functions described herein.

In some aspects of the disclosure, the processor 1504 may include frequency configuration circuitry 1544 configured for various functions, including, for example, determining a center frequency and bandwidth to be used for each measuring the received power. Thus, frequency configuration circuitry 1544 may act in cooperation with power detection/measurement circuitry 1542 and beam scanning circuitry 1543. Additionally, frequency configuration circuitry 1544 may be configured to determine different frequency candidates (i.e., different center frequencies and bandwidths). Still further, the frequency configuration circuitry 1544 may be configured to effectuate scanning around predetermined sync raster locations where a gNB sends periodic SSBs/RMSI, which, in turn, may be stored in memory 1505 as an example. In some examples, the frequency configuration circuitry 1544 may include one or more hardware components that provide the physical structure that performs processes related to frequency and bandwidth selection for use in power measurement and beam scanning. The frequency configuration circuitry 1544 may further be configured to execute frequency configuration software 1554 stored on the computer-readable medium 1506 to implement one or more functions described herein.

In some aspects of the disclosure, the processor 1504 may include fronthaul link beam determination circuitry 1545 configured for various functions, including, for example, determining or selecting the beam configuration to be used for the fronthaul link based on the measured power as determined by one or more of circuitries 1542, 1543, and 1544. In some examples, the fronthaul link beam determination circuitry 1545 may include one or more hardware components that provide the physical structure that performs processes related to selecting the FH link beam configuration to be used when at least receiving signals from (DL) and sending signals to (UL) the base station or gNB (or cell) in the repeater. The fronthaul link beam determination circuitry 1545 may further be configured to execute fronthaul link beam determination software 1555 stored on the computer-readable medium 1506 to implement one or more functions described herein.

In some further aspects of the disclosure, the processor 1504 may include access link (AL) beam determination circuitry 1546 configured for various functions, including, for example, determining or selecting a beam configuration to be used for transmission of signals between the repeater 1500 and a UE. In some examples, the access link beam determination circuitry 1546 may include one or more hardware components that provide the physical structure that performs processes related to obtaining measurements from the circuitries 1542, 1543, and/or 1544 and then selecting a beam configuration for the AL. In further aspects, access link beam determination circuitry 1546 may access previously determined measurements made for determination of the FH link beam configuration and which could be stored in memory 1505 or medium 1506. The access link beam determination circuitry 1546 may further be configured to access link beam determination software 1556 stored on the computer-readable medium 1506 to implement one or more functions described herein.

FIG. 16 is a flow chart illustrating an exemplary method 1600 for beam configuration at a wireless repeater device, which may include autonomous beam configuration according to some aspects. As described below, some or all illustrated features may be omitted in a particular implementation within the scope of the present disclosure, and some illustrated features may not be required for implementation of all embodiments. In some examples, the method 1600 may be carried out by the repeater device 1500 illustrated in FIG. 15. In some other examples, the method 1600 may be carried out by any suitable apparatus or means for carrying out the functions or algorithms described herein.

At block 1602, the repeater device receives one or more signals from at least one of a base station or one or more user equipment (UE). In aspects, the one or more signals may be received from a plurality of beam directions, where some of the signals are received from one beam direction, another parts of the signals are received from another beam direction, and so forth. In an example, the communication and processing circuitry 1541 and transceiver 1510 or equivalents thereof may provide means for receiving one or more signals in the repeater for each of a plurality of beam directions. In further aspects, the processes of receiving the one or more signals in block 1602 may include scanning through the plurality of beam directions, such as with a means for scanning that may be implemented with beam scanning circuitry 1543.

Additionally, method 1600 includes measuring the received power for each of the one or more received signals for each beam location of the plurality of beam locations as shown in block 1604. In an aspect, the power detector/measure circuitry 1542 or equivalents thereof may provide means for measuring the received power for each of the one or more received signals for each beam location of the plurality of beam locations.

Additionally, method 1600 may include selecting, setting, or determining a beam forming configuration for transmissions on a fronthaul link between the repeater and at least one base station based on the measured received power of the one or more signals as shown in block 1606. It is noted that the base station may include any of the base stations (BSs), gNBs, or scheduling entities of FIGS. 1, 2, 5-11, 13, and 14. In an aspect, FH link beam determination circuitry 1545 or equivalents thereof may provide means for selecting or determining a beam forming configuration for transmissions on a fronthaul link between the repeater and at least one base station based on the measured received power of the one or more signals.

According to further aspects, method 1600 may include that the measuring the received power of the one or more signals in the repeater for each of the plurality of beam directions is a measurement of a total received analog power for each of the plurality of beam directions. Additionally, method 1600 may include utilizing a plurality of receive beamforming configurations for measuring the received power in each of the plurality of beam directions (i.e., that various different beam configurations are not just concerning the direction of a beam, but also beam width, for example).

In yet further aspects, method 1600 may include that the measuring of the received power of the one or more signals in the repeater for each of the plurality of beam directions includes configuring a center frequency and bandwidth of the repeater for receiving the one or more signals. Further, the method 1600 may include processing each of the one or more signals received around the center frequency and within the bandwidth including converting to at least an intermediate frequency (IF) to measure the received power.

In still further aspects, method 1600 may include that the measuring of the received power of the one or more signals in the repeater for each of the plurality of beam directions includes configuring a plurality of center frequencies and bandwidths of the repeater for receiving the one or more signals, and then processing each of the one or more signals received around each of the plurality of center frequencies and within the bandwidths to measure the received power.

According to still further aspects, method 1600 may include that the measuring of the received power of the one or more signals in the repeater for each of the plurality of beam directions includes reducing a bandwidth of the received signals to a narrower bandwidth, and measuring the received power for each of the plurality of beam directions over the narrower bandwidth. In yet further aspects, method 1600 may include that the measuring of the received power of the one or more signals in the repeater for each of the plurality of beam directions includes determining a plurality of a center frequencies and a plurality of bandwidths to search based on a plurality of predetermined synchronization raster locations used by one or more base stations in the communication system for broadcasting periodic signals.

Still in further aspects, method 1600 may include determining a duty cycle controlling a time period for measuring the received power at each of the plurality of beam directions based on a periodicity of the periodic signals broadcast by the one or more base stations. In other disclosed aspects, each of the periodic signals may include a periodic burst, wherein measuring the received power of the one or more signals in the repeater for each of the plurality of beam directions further comprises measuring the received power for the one or more signals within a time duration of each periodic burst.

Figure 17:
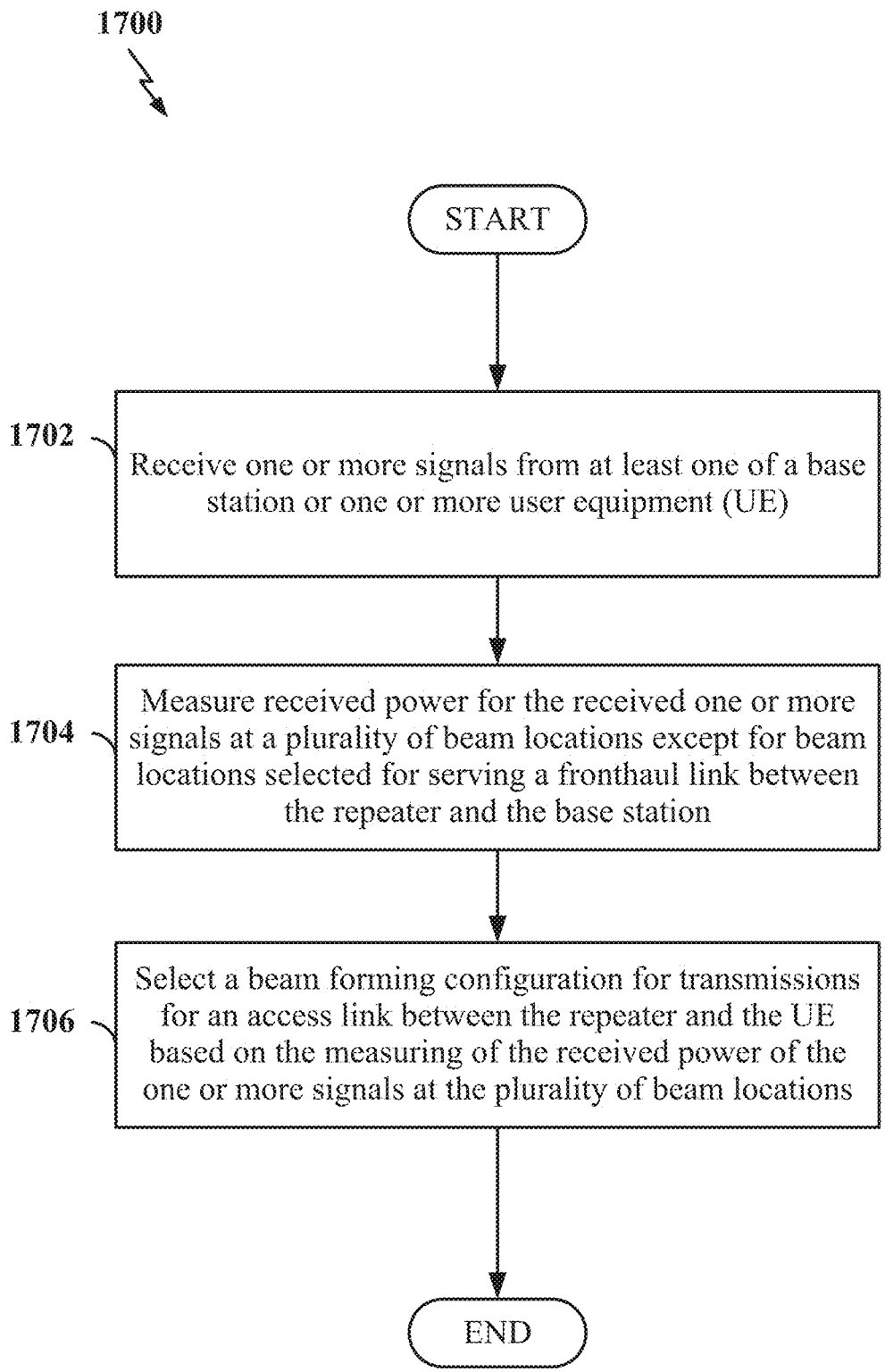
FIG. 17 is a flow chart illustrating another exemplary method implemented at a wireless repeater device according to some aspects.

FIG. 17 is a flow chart illustrating another exemplary method 1700 for beam configuration at a wireless repeater device, which may include autonomous beam configuration according to some aspects. In particular, method 1700 relates to beam configuration for the access link (AL), which may be performed independent of the method 1600 or may also be performed in conjunction with or after the method 1600 (particularly in the cases where method 1700 utilizes measurement information obtained during the method 1600). As described below, some or all illustrated features may be omitted in a particular implementation within the scope of the present disclosure, and some illustrated features may not be required for implementation of all embodiments. In some examples, the method 1700 may be carried out by the repeater device 1500 illustrated in FIG. 15. In some other examples, the method 1700 may be carried out by any suitable apparatus or means for carrying out the functions or algorithms described herein.

As shown in block 1702, method 1700 includes receiving one or more signals from determining a plurality of beam locations concerning at least one or more transmissions from a base station or one or more transmissions from a user equipment (UE). In aspects, the one or more signals may be received from a plurality of beam directions, where some of the signals are received from one beam direction, another parts of the signals are received from another beam direction, and so forth. In an example, the communication and processing circuitry 1541 and transceiver 1510 or equivalents thereof may provide means for receiving one or more signals in the repeater for each of a plurality of beam directions. In further aspects, the processes of receiving the one or more signals in block 1702 may include scanning through the plurality of beam directions, such as with a means for scanning such as beam scanning circuitry 1543.

Further, method 1700 includes measuring received power for one or more received signals in the plurality of beam locations as shown in block 1704. Additionally, method 1700 measuring or determining the received power of the one or more received signals except for beam locations that have been selected for serving a fronthaul link between the repeater and the base station. In an aspect, block 1704 includes examining or looking at the scanned beam locations from the base station (either current or previously determined during the FH beam configuration setup), and also scanning at the repeater for signals from one or more UEs in range of the repeater. In an example, the power detector/measure circuitry 1542 or equivalents thereof may provide means for measuring the received power for each of the one or more received signals for each beam location of the plurality of beam locations.

Additionally, method 1700 includes selecting, setting, or determining a beam forming configuration for transmissions for an access link between the repeater and the UE based on the measuring of the received power of the one or more signals at the plurality of beam locations as shown at block 1706. It is noted that the UE and the base station may include any of the UEs or base stations (BSs), gNBs, or scheduling entities of FIGS. 1, 2, 5-11, 13, and 14. In an aspect, AL link beam determination circuitry 1546 or equivalents thereof may provide means for selecting or determining a beam forming configuration for transmissions on the access link between the repeater and the UE based on the measured received power of the one or more signals.

In further aspects, method 1700 may include measuring of the received power for one or more received signals in the plurality of beam locations based on predetermined measurement information used for establishing a beam configuration for the fronthaul link between the repeater and the base station. For example, the scan and power measurements used for the FH link determination may be stored in memory and then accessed during the execution of method 1700 in order to avoid having to scan these beam locations again and, thus, save processing resources.

In further aspects, method 1700 may include that determining the beam forming configuration for the access link includes determining whether at least one beam direction has a corresponding measured received power that is less than a first predetermined power threshold, and then prohibiting selection of the at least beam direction for the beam forming configuration when the corresponding measured received power is less than the first predetermined power threshold. As discussed previously, this process avoids obstructed beam directions, for example.

In still more aspects, method 1700 may include that determining the beam forming configuration for the access link includes determining whether at least one beam direction has a corresponding measured received power that is greater than a second predetermined power threshold, and then prohibiting selection of the at least beam direction for the beam forming configuration when the corresponding measured received power greater than the second predetermined power threshold.

In one configuration, the repeater device 1500 may include means for measuring received power of one or more signals in the repeater for each of a plurality of beam directions, and means for determining a beam forming configuration for a fronthaul link between the repeater and at least one base station based on the measured received power of each of plurality of beam directions. In one aspect, the aforementioned means may be the processor 1504 shown in FIG. 15 and configured to perform the functions recited by the aforementioned means. In another aspect, the aforementioned means may be a circuit, or any apparatus configured to perform the functions recited by the aforementioned means.

In another configuration, the repeater device 1500 may include means for determining a plurality of beam locations concerning at least one or more transmissions from a base station or one or more transmissions from a user equipment (UE) that are not a beam location serving a fronthaul link between the repeater and the base station. Additionally, the repeater device 1500 may include means for measuring received power for one or more received signals in the plurality of beam locations, and means for determining a beam forming configuration for an access link between the repeater and the UE based on the measured received power of the one or more received signals. In one aspect, the aforementioned means may be the processor 1504 shown in FIG. 15 and configured to perform the functions recited by the aforementioned means. In another aspect, the aforementioned means may be a circuit, or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

The following provides an overview of aspects of the present disclosure:

Aspect 1: A method of beam forming in a repeater in a communication system, the method comprising: receiving one or more signals in the repeater for each of a plurality of beam directions; measuring received power of each of the one or more signals for each of the plurality of beam directions; and determining a beam forming configuration for transmissions on a fronthaul link between the repeater and at least one base station based on the measured received power of the one or more signals.

Aspect 2: The method of aspect 1, wherein measuring the received power of the one or more signals for each of the plurality of beam directions comprises: measuring a total received analog power for each of the plurality of beam directions.

Aspect 3: The method of aspect 1 or aspect 2, further comprising: utilizing a plurality of receive beamforming configurations for measuring the received power in each of the plurality of beam directions.

Aspect 4: The method of any of aspects 1 through 3, wherein measuring the received power of the one or more signals for each of the plurality of beam directions comprises: configuring a center frequency and a bandwidth of the repeater for receiving the one or more signals; and processing each of the one or more signals received around the center frequency and within the bandwidth including converting to at least an intermediate frequency (IF) to measure the received power.

Aspect 5: The method of any of aspects 1 through 3, wherein measuring the received power of the one or more signals for each of the plurality of beam directions comprises: configuring a plurality of center frequencies and bandwidths of the repeater for receiving the one or more signals; and processing each of the one or more signals received around each of the plurality of center frequencies and within the bandwidths to measure the received power.

Aspect 6: The method of any of aspects 1 through 3, wherein measuring the received power of the one or more signals for each of the plurality of beam directions comprises: reducing a bandwidth of the received signals to a narrower bandwidth; and measuring the received power for each of the plurality of beam directions over the narrower bandwidth.

Aspect 7: The method of any of aspects 1 through 3, wherein measuring the received power of the one or more signals for each of the plurality of beam directions comprises: determining a plurality of a center frequencies and a plurality of bandwidths to search based on a plurality of predetermined synchronization raster locations used by one or more base stations in the communication system for broadcasting periodic signals.

Aspect 8: The method of any of aspects 1 through 3 and 7, wherein measuring the received power of the one or more signals for each of the plurality of beam directions further comprises: determining a duty cycle controlling a time period for measuring the received power at each of the plurality of beam directions based on a periodicity of the periodic signals broadcast by the one or more base stations.

Aspect 9: The method of any of aspects 1 through 3 and 7 through 8, further comprising: each of the periodic signals further comprising a periodic burst, wherein measuring the received power of the one or more signals in the repeater for each of the plurality of beam directions further comprises: measuring the received power for the one or more signals within a time duration of each periodic burst.

Aspect 10: The method of any of aspects 1 through 9, further comprising: transmitting one or more signals to be relayed via the fronthaul link using the determined beam forming configuration.

Aspect 11: A wireless repeater device in a wireless communication network, comprising: a wireless transceiver; a memory; and a processor communicatively coupled to the wireless transceiver and the memory, wherein the processor and the memory are configured to: receive one or more signals in the repeater for each of a plurality of beam directions; measure received power of each of the one or more signals for each of the plurality of beam directions; and determine a beam forming configuration for transmissions on a fronthaul link between the repeater and at least one base station based on the measured received power of the one or more signals.

Aspect 12: The wireless repeater device of aspect 11, wherein the processor and the memory are further configured to transmit one or more signals to be relayed via the fronthaul link using the determined beam forming configuration.

Aspect 13: The wireless repeater device of aspect 11 or 12, wherein the processor and the memory are further configured to measure the received power of the one or more signals for each of the plurality of beam directions by measuring a total received analog power for each of the plurality of beam directions.

Aspect 14: The wireless repeater device of any of aspects 11 through 13, wherein the processor and the memory are further configured to utilize a plurality of receive beamforming configurations for measuring the received power in each of the plurality of beam directions.

Aspect 15: The wireless repeater device of any of aspects 11 through 14, wherein the processor and the memory are further configured to measure the received power of the one or more signals for each of the plurality of beam directions by configuring a center frequency and a bandwidth of the repeater for receiving the one or more signals, and processing each of the one or more signals received around the center frequency and within the bandwidth including converting to at least an intermediate frequency (IF) to measure the received power.

Aspect 16: The wireless repeater device of any of aspects 11 through 14, wherein the processor and the memory are further configured to measure the received power of the one or more signals for each of the plurality of beam directions by configuring a plurality of center frequencies and bandwidths of the repeater for receiving the one or more signals, and processing each of the one or more signals received around each of the plurality of center frequencies and within the bandwidths to measure the received power.

Aspect 17: The wireless repeater device of any of aspects 11 through 14, wherein the processor and the memory are further configured to measure the received power of the one or more signals for each of the plurality of beam directions by reducing a bandwidth of the received signals to a narrower bandwidth, and measuring the received power for each of the plurality of beam directions over the narrower bandwidth.

Aspect 18: The wireless repeater device any of aspects 11 through 14 or 17, wherein the processor and the memory are further configured to measure the received power of the one or more signals for each of the plurality of beam directions by determining a plurality of a center frequencies and a plurality of bandwidths to search based on a plurality of predetermined synchronization raster locations used by one or more base stations in the communication system for broadcasting periodic signals.

Aspect 19: The wireless repeater device of aspect 18, wherein the processor and the memory are further configured to measure the received power of the one or more signals for each of the plurality of beam directions by determining a duty cycle controlling a time period for measuring the received power at each of the plurality of beam directions based on a periodicity of the periodic signals broadcast by the one or more base stations.

Aspect 20: The wireless repeater device of aspects 18 or 19, further comprising: each of the periodic signals further comprising a periodic burst; and wherein the processor and the memory are configured to measure the received power of the one or more signals for each of the plurality of beam directions by measuring the received power for the one or more signals within a time duration of each periodic burst.

Aspect 21: A method of beam forming in a repeater in a communication system, the method comprising: receiving one or more signals from at least one of a base station or one or more user equipment (UE); measuring received power for the received one or more signals at a plurality of beam locations except for beam locations selected for serving a fronthaul link between the repeater and the base station; and selecting a beam forming configuration for transmissions for an access link between the repeater and the UE based on the measuring of the received power of the one or more signals at the plurality of beam locations.

Aspect 22: The method of aspect 21, wherein selecting the beam forming configuration for the access link further comprises: comparing the measured received power of the one or more signals with a first power threshold; and selecting the beam forming configuration for the access link from one or more beam locations corresponding to signals of the one or more signals having a corresponding measured received power greater than the first power threshold.

Aspect 23: The method of aspect 21, wherein selecting the beam forming configuration for the access link further comprises: comparing the measured received power of the one or more signals with a second power threshold; and further selecting the beam forming configuration for the access link from one or more beam locations corresponding to signals of the one or more signals having a corresponding measured received power less than the second power threshold.

Aspect 24: The method of any of aspects 21 through 23, further comprising: transmitting one or more relayed signals via the access link using the determined beam forming configuration.

Aspect 25: The method of any of aspects 21 through 24, wherein measuring of the received power for the one or more received signals in the plurality of beam locations is based on predetermined measurement information used for previously establishing a fronthaul beam configuration for the fronthaul link between the repeater and the base station.

Aspect 26: A wireless repeater device in a wireless communication network, comprising: a wireless transceiver; a memory; and a processor communicatively coupled to the wireless transceiver and the memory, wherein the processor and the memory are configured to: receive one or more signals from at least one of a base station or one or more user equipment (UE); measure received power for the received one or more signals at a plurality of beam locations except for beam locations selected for serving a fronthaul link between the repeater and the base station; and select a beam forming configuration for transmissions for an access link between the repeater and the UE based on the measuring of the received power of the one or more signals at the plurality of beam locations.

Aspect 27: The wireless repeater device of aspect 26, wherein the processor and the memory are configured to select the beam forming configuration for the access link including: comparing the measured received power of the one or more signals with a first power threshold; and selecting the beam forming configuration for the access link from one or more beam locations corresponding to signals of the one or more signals having a corresponding measured received power greater than the first power threshold.

Aspect 28: The wireless repeater device of aspects 26 or 27, wherein the processor and the memory are configured to select the beam forming configuration for the access link including: comparing the measured received power of the one or more signals with a second power threshold; and further selecting the beam forming configuration for the access link from one or more beam locations corresponding to signals of the one or more signals having a corresponding measured received power less than the second power threshold.

Aspect 29: The wireless repeater device of any of aspects 26 through 28, wherein the processor and the memory are further configured to transmit one or more relayed signals via the access link using the determined beam forming configuration.

Aspect 30: The wireless repeater device of any of aspects 26 through 29, wherein the processor and the memory are further configured to measure the received power for the one or more received signals in the plurality of beam locations based on predetermined measurement information used for previously establishing a fronthaul beam configuration for the fronthaul link between the wireless repeater device and the base station.

Aspect 31: An apparatus configured for wireless communication comprising at least one means for performing a method of any one of aspects 1 through 10 or aspects 21 through 25.

Aspect 32: A non-transitory computer-readable medium storing computer-executable code, comprising code for causing an apparatus to perform a method of any one of aspects 1 through 10 or aspects 21 through 25.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The word "obtain" is used to mean to get, to acquire, to select, to copy, to derive, and/or to calculate. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of beam forming in a repeater in a wireless communication network, the method comprising:

selecting a first beam forming configuration, corresponding to a first direction, to serve a fronthaul link between the repeater and a base station;
receiving one or more signals from at least one user equipment (UE);
measuring received power of the one or more signals in a plurality of directions except the first direction selected to serve the fronthaul link between the repeater and the base station; and
selecting a second beam forming configuration corresponding to a second direction, different from the first direction, to serve an access link between the repeater and the at least one UE based on the measured received power of the one or more signals in the plurality of directions.

2. The method of claim 1, wherein the selecting the second beam forming configuration to serve the access link further comprises:
comparing the measured received power of the one or more signals with a first power threshold; and
prohibiting a selecting of the second beam forming configuration from one or more directions corresponding to signals of the one or more signals having a corresponding measured received power greater than the first power threshold.

3. The method of claim 1, wherein the selecting the second beam forming configuration to serve the access link further comprises:
comparing the measured received power of the one or more signals with a second power threshold; and
prohibiting a further selecting of the second beam forming configuration from one or more directions corresponding to signals of the one or more signals having a corresponding measured received power less than the second power threshold.

4. The method of claim 1, further comprising:
transmitting one or more relayed signals via the access link using the second beam forming configuration.

5. The method of claim 1, wherein the selecting the first beam forming configuration is based on predetermined measurement information used for previously establishing a fronthaul beam configuration for the fronthaul link between the repeater and the base station.

6. A repeater in a wireless communication network, comprising:
a wireless transceiver;
one or more memories; and
one or more processors communicatively coupled to the wireless transceiver and the one or more memories, the one or more processors being configured to, based at least in part on information stored in the one or more memories:
select a first beam forming configuration, corresponding to a first direction, to serve a fronthaul link between the repeater and a base station;
receive one or more signals from at least one user equipment (UE);
measure received power of the one or more signals in a plurality of directions except the first direction selected to serve the fronthaul link between the repeater and the base station; and
select a second beam forming configuration corresponding to a second direction, different from the first direction, to serve an access link between the repeater and the at least one UE based on the measured received power of the one or more signals in the plurality of directions.

7. The repeater of claim 6, wherein the one or more processors are configured to select the second beam forming configuration to serve the access link by being further configured to:
compare the measured received power of the one or more signals with a first power threshold; and
prohibit a selecting of the second beam forming configuration from one or more directions corresponding to signals of the one or more signals having a corresponding measured received power greater than the first power threshold.

8. The repeater of claim 6, wherein the one or more processors are configured to select the second beam forming configuration to serve the access link by being further configured to:
compare the measured received power of the one or more signals with a second power threshold; and
prohibit a further selecting of the second beam forming configuration from one or more directions corresponding to signals of the one or more signals having a corresponding measured received power less than the second power threshold.

9. The repeater of claim 6, wherein the one or more processors are further configured to transmit one or more relayed signals via the access link using the second beam forming configuration.

10. The repeater of claim 6, wherein to select the first beam forming configuration, the one or more processors are further configured to is based on predetermined measurement information used for previously establishing a fronthaul beam configuration for the fronthaul link between the repeater and the base station.

11. A repeater in a wireless communication network, comprising:
means for selecting a first beam forming configuration, corresponding to a first direction, to serve a fronthaul link between the repeater and a base station;
means for receiving one or more signals from at least one user equipment (UE);
means for measuring received power of the one or more signals in a plurality of directions except the first direction selected to serve the fronthaul link between the repeater and the base station; and
means for selecting a second beam forming configuration corresponding to a second direction, different from the first direction, to serve an access link between the repeater and the at least one UE based on the measured received power of the one or more signals in the plurality of directions.

12. The repeater of claim 11, wherein the means for selecting the second beam forming configuration to serve the access link further comprises:
means for comparing the measured received power of the one or more signals with a first power threshold; and
means for prohibiting a selecting of the second beam forming configuration from one or more directions corresponding to signals of the one or more signals having a corresponding measured received power greater than the first power threshold.

13. The repeater of claim 11, wherein the means for selecting the second beam forming configuration to serve the access link further comprises:
means for comparing the measured received power of the one or more signals with a second power threshold; and
means for prohibiting a further selecting of the second beam forming configuration from one or more directions corresponding to signals of the one or more signals having a corresponding measured received power less than the second power threshold.

14. The repeater of claim 11, further comprising:
means for transmitting one or more relayed signals via the access link using the second beam forming configuration.

15. The repeater of claim 11, wherein selecting the first beam forming configuration is based on predetermined measurement information used for previously establishing a fronthaul beam configuration for the fronthaul link between the repeater and the base station.

* * * * *